United States Patent [19]
Woodside

[11] Patent Number: 5,972,503
[45] Date of Patent: *Oct. 26, 1999

[54] CHEMICAL TREATMENTS FOR FIBERS AND WIRE-COATED COMPOSITE STRANDS FOR MOLDING FIBER-REINFORCED THERMOPLASTIC COMPOSITE ARTICLES

[75] Inventor: Andrew B. Woodside, Pickerington, Ohio

[73] Assignee: Owens Corning Fiberglas Technology, Inc., Summit, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/769,340

[22] Filed: Dec. 19, 1996

Related U.S. Application Data

[62] Division of application No. 08/695,909, Aug. 12, 1996.

[51] Int. Cl.⁶ .................... B05D 3/02; B29B 13/00; B29C 47/00
[52] U.S. Cl. ............... 428/378; 428/361; 428/375; 428/391; 428/392; 428/394; 156/244.2; 156/180; 264/271.1; 264/279.1
[58] Field of Search ............... 428/391, 392, 428/378, 375, 359, 394; 156/244.2, 180; 264/271.1, 279.1, 173.19, 173.16, 177.13, 177.16

[56] References Cited

U.S. PATENT DOCUMENTS

| | | |
|---|---|---|
| 2,723,215 | 11/1955 | Biefeld et al. . |
| 3,022,210 | 2/1962 | Phillips . |
| 3,042,570 | 7/1962 | Bradt . |
| 3,091,018 | 5/1963 | Rees . |
| 3,134,704 | 5/1964 | Modigliani . |

(List continued on next page.)

FOREIGN PATENT DOCUMENTS

| | | |
|---|---|---|
| 476752 | 3/1992 | European Pat. Off. . |
| 657395 | 6/1995 | European Pat. Off. . |
| 657396 | 6/1995 | European Pat. Off. . |
| 2600585 | 6/1986 | France . |
| 2600585 | 12/1987 | France . |
| 54-134194 | 10/1979 | Japan . |
| 47740 | 2/1994 | Japan . |
| 706832 | 4/1954 | United Kingdom . |
| 97/17304 | 5/1997 | WIPO . |

*Primary Examiner*—William Krynski
*Assistant Examiner*—J. M. Gray
*Attorney, Agent, or Firm*—Inger H. Eckert

[57] ABSTRACT

In one general aspect, the invention involves applying a chemical treatment to fibers, such as reinforcing fibers suitable for making a composite article, so as to size and/or preimpregnate the fibers. The chemical treatment has a relatively low viscosity and is substantially solvent-free and non-radiation curable. Heat energy may be employed to lower the viscosity and improve the wetting ability of the applied treatment and/or to increase the molecular weight of, or otherwise cure, the treatment with essentially no generation of solvent vapor. The treated fibers are used to form a composite strand, which may be subsequently processed in-line or off-line into a composite article having fibers disposed in a polymeric matrix. Another general aspect relates to encased composite strands, in thread or pellet form, and to wire-coating methods and apparatus for making them. The strands are moldable into fiber-reinforced thermoplastic composite articles. Each strand is made from fibers, including reinforcing fibers and optionally fibers of a matrix material, that are impregnated with a chemical treatment so that the treatment is disposed between substantially all of the fibers.

20 Claims, 5 Drawing Sheets

U.S. PATENT DOCUMENTS

| | | |
|---|---|---|
| 3,265,479 | 8/1966 | Glaser . |
| 3,268,312 | 8/1966 | Grant . |
| 3,276,931 | 10/1966 | Rees . |
| 3,287,204 | 11/1966 | Marzocchi . |
| 3,391,052 | 7/1968 | Marzocchi . |
| 3,473,950 | 10/1969 | Wong . |
| 3,494,753 | 2/1970 | Sears . |
| 3,538,722 | 11/1970 | Stream . |
| 3,620,701 | 11/1971 | Janetos et al. . |
| 3,717,448 | 2/1973 | Smith . |
| 3,783,001 | 1/1974 | Marzocchi . |
| 3,817,728 | 6/1974 | Petersen . |
| 3,977,854 | 8/1976 | Fulmer et al. . |
| 4,169,186 | 9/1979 | Tazaki et al. . |
| 4,187,347 | 2/1980 | Brook . |
| 4,194,896 | 3/1980 | Symborski et al. . |
| 4,195,113 | 3/1980 | Brook . |
| 4,300,929 | 11/1981 | Carruth et al. . |
| 4,368,232 | 1/1983 | Morioka et al. . |
| 4,439,387 | 3/1984 | Hawley . |
| 4,486,373 | 12/1984 | Kurauchi et al. . |
| 4,530,860 | 7/1985 | Johnson . |
| 4,537,610 | 8/1985 | Armstrong et al. . |
| 4,567,102 | 1/1986 | Pollet et al. . |
| 4,614,678 | 9/1986 | Ganga . |
| 4,713,139 | 12/1987 | Ganga . |
| 4,745,028 | 5/1988 | Das et al. . |
| 4,788,104 | 11/1988 | Adriaensen et al. . |
| 4,853,021 | 8/1989 | Soszka et al. . |
| 4,997,703 | 3/1991 | Gehrig . |
| 5,011,523 | 4/1991 | Roncato et al. . |
| 5,034,276 | 7/1991 | Zwiersch et al. . |
| 5,049,407 | 9/1991 | Soszka et al. . |
| 5,055,119 | 10/1991 | Flautt et al. . |
| 5,104,703 | 4/1992 | Rachman et al. . |
| 5,171,634 | 12/1992 | Soszka et al. . |
| 5,176,775 | 1/1993 | Montsinger . |
| 5,316,561 | 5/1994 | Roncato et al. . |
| 5,328,493 | 7/1994 | Roncato et al. . |
| 5,397,608 | 3/1995 | Soens . |
| 5,425,796 | 6/1995 | Loubinoux et al. . |
| 5,451,355 | 9/1995 | Boissonnat et al. . |
| 5,454,846 | 10/1995 | Roncato et al. . |
| 5,747,137 | 5/1998 | Cutolo et al. ............... 428/378 |

CHEMICAL TREATMENTS FOR FIBERS AND WIRE-COATED COMPOSITE STRANDS FOR MOLDING FIBER-REINFORCED THERMOPLASTIC COMPOSITE ARTICLES

This is a division of copending U.S. patent application Ser. No. 08/695,909, filed Aug. 12, 1996.

FIELD AND INDUSTRIAL APPLICABILITY OF THE INVENTION

The invention relates to applying a chemical treatment to fibers which are suitable for processing into a composite. More particularly, the invention relates to applying a chemical treatment to fibers where the chemical treatment has a low viscosity and is substantially free of an unreactable solvent. Even more particularly, the invention relates to using heat energy to lower the viscosity and improve the wetting ability of a chemical treatment after being applied to the fibers and/or to increase the molecular weight of or cure the applied chemical treatment with very little, if any, generation of volatile organic carbon (VOC).

The present invention also generally relates to the manufacture of fiber-reinforced composite articles, in particular, to wire-coated fiber/polymer composite strands used in molding fiber-reinforced composite articles. More particularly, the invention relates to thermoplastic-encased fiber/polymer composite threads and pellets moldable into fiber-reinforced thermoplastic composite articles.

BACKGROUND OF THE INVENTION

Fibers or fibrous materials are often used as reinforcements in composite materials. Glass and other ceramic fibers are commonly manufactured by supplying the ceramic in molten form to a bushing, drawing fibers from the bushing, applying a chemical treatment, such as a size, to the drawn ceramic fibers and then gathering the sized fibers into a tow or strand. There are basically three known general types of chemical treatments—solvent-based systems, melt-based systems and radiation cure-based systems.

In a broad sense, the solvent-based chemical treatments include organic materials that are in aqueous solutions (i.e., dissolved, suspended, or otherwise dispersed in water), as well as those that are dissolved in organic solvents. U.S. Pat. Nos. 5,055,119, 5,034,276 and 3,473,950 disclose examples of such chemical treatments. The solvent (i.e., water, organic solvent, or other suitable solvent) is used to lower the viscosity of the chemical treatment to facilitate wetting of the glass fibers. The solvent is substantially unreactable with the other constituents of the chemical treatment and is driven out of the chemical treatment after the wetting of the glass fibers. In each process for applying solvent-based chemical treatments, an external source of heat or some other device external to the fibers is used to evaporate or otherwise remove the water or other solvent from the applied chemical treatment, leaving a coating of organic material on the glass fibers. One drawback to a solvent-based process is that the added step of removing the solvent increases production costs. In addition, some organic solvents are very flammable in vapor form and pose a fire hazard. Another problem with solvent-based systems is that it is very difficult, if not impossible, to remove all of the solvent from the applied chemical treatment. Therefore, solvent-based chemical treatments are limited, as a practical matter, to those systems where any residual solvent left behind in the coating of organic material remaining on the fibers will not have a significantly adverse affect.

With prior melt-based chemical treatments, thermoplastic-type organic solids are melted and applied to the glass fibers. U.S. Pat. Nos. 4,567,102, 4,537,610, 3,783,001 and 3,473,950 disclose examples of such chemical treatments. One disadvantage of prior melt-based processes is the energy costs associated with melting the chemical treatments. The organic solids used with prior melt-based systems are melted at relatively high temperatures in order for the melted organic solids to be applied to the glass fibers. The high temperatures are needed because the organic solids used in the past have relatively high molecular weights. Such high melt temperatures also pose the risk to workers of being burned by the equipment used to melt the plastic material and by the molten plastic material itself. In addition, specialized equipment is typically needed to apply and otherwise handle the high-temperature molten plastic material.

The radiation cure-based chemical treatments are typically acrylate-based organic chemicals, either with or without a solvent, which are cured with ultraviolet radiation via a photoinitiator. U.S. Pat. Nos. 5,171,634 and 5,011,523 disclose examples of such chemical treatments. A major disadvantage to processes using such chemical treatments is that the radiation used, such as ultraviolet radiation, and the chemical treatment used, such as acrylates, are relatively hazardous, often requiring special handling and safety precautions. Some of these processes, such as that disclosed in U.S. Pat. No. 5,171,634, require the radiation curing to be repeated a number of times to obtain the maximum benefit. Each additional radiation-curing step increases the risks involved and adds additional cost to the process. Furthermore, radiation-curable thermoset plastics, and their requisite photoinitiators, represent a highly specialized area of thermoset chemistry. As a consequence, such radiation-cured chemical treatments are expensive and not generally compatible with various classes of matrix resins.

In order to fabricate composite parts, the strands of glass fibers are often further chemically treated in an off-line impregnation process with a polymeric resin. The resin can be a thermoset, either one- or two-part, or a thermoplastic. In one example, previously formed and sized continuous glass fibers are impregnated with a thermosetting resin and then pulled through a heated pultrusion die to cure the resin and make the composite article, such as ladder rails. In such an off-line process, the continuous glass fibers must be separated in some manner to allow impregnation of the resin between the fibers and then recombined. This requirement almost always results in the use of additional hardware such as spreader bars, impregnation baths, and drying or curing ovens. These types of processes have the disadvantage that they add cost and complexity to the process. In addition, the resultant extra handling of the glass fibers can cause breakage of the individual glass filaments, and thereby a degradation in the properties of the composite article. Therefore, while such off-line processes may be effective, they are time-consuming and inefficient (e.g., requiring additional process steps) and, thus, expensive.

Accordingly, there is a need in the art for a safer, more efficient and more cost-effective process for applying a chemical treatment to glass fibers, where the viscosity of the chemical treatment is low enough to sufficiently wet the glass fibers without the need for a solvent, where the chemical treatment does not require radiation curing and the viscosity of the applied chemical treatment increases with very little, if any, generation of water, volatile organic carbon (VOC) or other solvent vapor, and where the resulting chemically treated glass fibers are suitable for subsequent processing into a composite article. There is also a need for an in-line process for forming a preimpregnated glass composite strand from a plurality of continuously formed glass fibers which are chemically treated in this manner, where the resulting prepreg strand is suitable for subsequent in-line or off-line processing into a composite article.

The use of composites having fiber-reinforced polymeric matrices is widespread. Fiber-reinforced polymeric composite products have been manufactured using a variety of processes and materials. As referred to above, one such process involves impregnating one or more strands or bundles of reinforcing fibers (e.g., glass fibers, synthetic fibers or some other reinforcing fibers) with a thermoplastic material, and using the resulting composite strands to mold a composite article. These composite strands have been used in the form of continuous threads (i.e., long lengths of strand) and discrete pellets (i.e., short lengths of strand). The fibers from the composite strands provide the reinforcement and the thermoplastic material forms at least part of the matrix for the composite article.

It is desirable for each fiber strand to be fully impregnated with the thermoplastic matrix material, that is, for the thermoplastic material essentially to be evenly distributed throughout each bundle of fibers and between the fibers. Because all of the fibers start out surrounded by matrix material, the fully impregnated fiber strands can be molded less expensively and more efficiently and the corresponding composite article can exhibit improved properties. However, it is difficult and time-consuming to fully impregnate fiber strands with typical thermoplastic matrix materials (e.g., engineering thermoplastics). Fully impregnating strands at high throughput rates has been particularly difficult, especially at the throughput rates typically experienced during the production of continuously formed glass reinforcing fibers.

In an effort to fully impregnate continuously formed glass fiber strands, the number of fibers used to form each strand (i.e., fiber density) has been reduced from a typical density of about 2000 fibers/strand to 1200 fibers/strand or less, to reduce the time it takes to impregnate each fiber strand. However, by reducing the number of fibers in each strand being processed at a given time, the production output and cost efficiency of the process can be adversely impacted. In addition, fully impregnating even such lower density strands is still sufficiently time-consuming to prevent even the lower density strands from being fully impregnated and processed at the higher throughput rates typically approached in the production of continuous glass reinforcing fibers.

In an effort to obtain higher throughputs, one prior process only partially impregnates the fiber strand and coats the strand in a uniform layer of thermoplastic matrix material, leaving a central core of fibers not impregnated with the thermoplastic. This coating and partial impregnation of the strand is accomplished by pulling the strand through what has been referred to as a "wire-coating" device. Wire-coating devices, such as that disclosed in U.S. Pat. No. 5,451,355, typically include an extruder for supplying molten thermoplastic matrix material and a die having an entrance orifice, an exit orifice and a coating chamber disposed therebetween. The extruder supplies molten thermoplastic material to the coating chamber. The strand is coated and partially impregnated with the thermoplastic matrix material as it passes through the coating chamber, and the coating is formed into a uniform layer when the coated strand passes through the exit orifice of the die. The resulting coated strand is either used in the form of a thread (e.g., in compression-molding applications) or cut into discrete pellets (e.g., in injection-molding applications). Because the strand is only partially impregnated with the thermoplastic matrix material, the strand can be processed at relatively high throughputs.

However, these partially impregnated wire-coated strands also exhibit a number of problems because of their central core of unimpregnated fibers. When in pellet form, the fibers in the central unimpregnated core tend to fall out of the thermoplastic coating. When the strand is in the form of a thread, the core fibers are less likely to fall out, but the core of these wire-coated threads must still be impregnated at some point to optimize the properties of the resulting composite article. Impregnating the central core of such wire-coated threads during the molding operation can be difficult and time-consuming, if not impossible as a practical matter. Thus, molding with such wire-coated threads can cause a reduction in the overall production rates, rather than an increase as desired.

Therefore, there is a need for a way to produce fully impregnated fiber strands at higher throughput rates, even when each strand has a relatively high fiber density, where the resulting composite strands, either in thread or pellet form, are suitable for molding fiber-reinforced thermoplastic articles.

SUMMARY OF THE INVENTION

An object of the invention is to attain a chemical treatment for fibers, such as glass fibers, that is substantially free of unreactable solvent. Another object is to achieve a solvent-free chemical treatment that is substantially non-photosetting. An additional object of the invention is to provide such a chemical treatment that has an enhanced wetting ability. A further object is to provide a solvent-free chemical treatment that may be cured or have its viscosity reduced through application of heat energy to the chemical treatment coated on fibers. Another object of the invention is to provide an advantageous process for applying a chemical treatment to fibers, so that the coated fibers may be made into composite strands useful for forming into composite articles. An additional object is to provide such a process that yields fibers thoroughly impregnated with chemical treatment.

Such objects are achieved via, inter alia, a method of making a composite product, such as a composite strand or a molded article prepared from such a strand product, the method generally comprising preparing a thermoplastic-encased composite strand material for disposing in a matrix material. The thermoplastic-encased composite is prepared by steps comprising: applying a chemical treatment in an amount sufficient to coat substantially all of a plurality of fibers comprising reinforcing fibers to form preimpregnated fibers, wherein the chemical treatment is compatible with the matrix material; gathering the preimpregnated fibers into a preimpregnated strand having the chemical treatment disposed between substantially all of the plurality of fibers; and encasing the preimpregnated strand by a process including wire-coating the preimpregnated strand with a thermoplastic material to form a thermoplastic coating and forming the thermoplastic coating into a thermoplastic sheath to form a thermoplastic-encased composite strand. In a preferred embodiment, the thermoplastic-encased composite strand is cut into lengths to form a plurality of pellets. Alternatively, the thermoplastic-encased composite strand may be packaged as a thread. In one embodiment, the reinforcing fibers include preformed reinforcing fibers. The plurality of fibers may also comprise matrix fibers. The method may also further comprise steps such as preparing the reinforcing fibers by a process including continuously forming reinforcement fibers from molten glass or preforming matrix fibers from a polymeric material. Optionally, the method may comprise preparing the reinforcing fibers in-line by a process including continuously forming reinforcement fibers from a molten glass material. The chemical treatment used in such a method may comprise water and an organic material in an amount providing the preimpregnated strand with an organic material content of from about 2% to about 25% by weight, with substantially all of the water in the chemical treatment being evaporated before the gathering step. The organic material may be a solid or a liquid dispersed or emulsified in the water. More preferably, the organic material content is from about 2% to about 15% by weight, and the evaporating step comprises heating the chemical treatment after the applying step, and even more preferably the organic material content is from about 6% to about 7% by weight, and the heating comprises supplying heat energy to the chemical treatment from an external source or from the plurality of fibers. In one embodiment, the chemical treatment is thermosetting, and the preparing of the thermoplastic-encased composite strand material further comprises the step of at least partially curing the chemical treatment after the applying step. The chemical treatment is preferably substantially solvent-free and substantially non-photosetting, and the organic material comprises a film former and a coupling agent. In one embodiment, the chemical treatment is thermoplastic, the film former includes a low molecular weight thermoplastic polymer, and the coupling agent includes a functionalized organic substrate. In another embodiment, the chemical treatment is thermosetting, the film former includes at least one of a multi-functional monomer and a low molecular weight mono-functional monomer, and the coupling agent includes a functionalized organic substrate. The method may further comprise combining the thermoplastic-encased composite strand with the matrix material to form a composite formulation, and molding the composite formulation. Furthermore, the method may comprise forming the thermoplastic-encased composite strand into pellets, and molding the pellets combined with a resinous matrix material to form a fiber-reinforced composite article. The invention is also directed to products made according to such methods.

Additionally, the invention relates to a composite product comprising a plurality of thermoplastic-encased composite strands useful in forming a fiber-reinforced composite article containing a matrix material, each thermoplastic-encased composite strand comprising a preimpregnated strand comprising a plurality of gathered fibers including reinforcing fibers substantially coated with a thermoplastic or thermosetting chemical treatment compatible with the matrix material. In one embodiment, the composite product comprises pellets cut from the composite strands, with the chemical treatment keeping the plurality of gathered fibers together in the pellets. Alternatively, the composite strands may be packaged in thread form. Preferably, the plurality of gathered fibers numbers in the range of from about 1,500 to about 10,000, more preferably, from about 2,000 to about 4,000. The plurality of gathered fibers may optionally include matrix fibers made from a thermoplastic material. In one embodiment, the chemical treatment comprises an organic material, and each preimpregnated strand has an organic material content of from about 2% to about 25% by weight, more preferably, from about 2% to about 15% by weight, and even more preferably, from about 6% to about 7% by weight. The chemical treatment may be thermoplastic, substantially solvent-free, and substantially non-photosetting, and comprise a (i) film former containing a low molecular weight thermoplastic polymer material and (ii) a coupling agent containing a functionalized organic substrate. Alternatively, the chemical treatment may be thermosetting, substantially solvent-free, and substantially non-photosetting, and comprise (i) a film former containing at least one of a multi-functional monomer and a low molecular weight mono-functional monomer and (ii) a coupling agent containing a functionalized organic substrate. The plurality of composite strands may be molded with a matrix material.

The invention further relates to a method for preparing a composite product, the method comprising the steps of: applying a thermosetting or thermoplastic chemical treatment to a plurality of fibers including glass or synthetic reinforcing fibers to form fibers coated with applied chemical treatment, the chemical treatment being substantially solvent-free and substantially non-photosetting; and heating the applied chemical treatment so as to lower the viscosity of at least a portion of the applied chemical treatment or cure at least partially the applied chemical treatment, or both, to form coated fibers. The chemical treatment may be applied in an amount of from about 0.1% to about 1% by weight to size the plurality of fibers, or in an amount of from about 2% to about 25% by weight to preimpregnate the plurality of fibers. The fibers may further include polymeric matrix fibers. In one preferred embodiment, the reinforcing fibers include glass reinforcing fibers and the heating step comprises supplying heat energy to the applied chemical treatment emanating from the glass reinforcing fibers, with the glass reinforcing fibers being at a temperature preferably of from about 150° C. to about 350° C., more preferably of from about 200° C. to about 300° C., during the applying step. The reinforcing fibers may include preformed reinforcing fibers, with the method further comprising the step of pre-heating the preformed reinforcing fibers. Also, the reinforcing fibers may include glass fibers, with the method further comprising the step of forming the glass fibers from a source of molten glass reinforcing material, where the heating step includes supplying heat energy retained in the glass reinforcing fibers from the forming step to the applied chemical treatment. The heating step may include supplying to the applied chemical treatment heat energy from a source external to the plurality of fibers. In one preferred embodiment, the chemical treatment is thermosetting and the heating step cures at least partially a portion of the applied chemical treatment. Alternatively, the chemical treatment is thermoplastic and the heating step lowers the viscosity of at least a portion of the applied chemical treatment. The method may further comprise a step of gathering the coated fibers together into a composite strand, and the heating step may occur after the gathering step. The chemical treatment may contain an organic material, with the composite strand having an organic material content of from about 2% to about 25% by weight. The method may also include the step of forming the composite strand into a composite article having the plurality of fibers disposed in a matrix formed at least in part by the applied chemical treatment. The plurality of fibers optionally includes polymeric matrix fibers forming at least part of the matrix of the composite article. The forming step may be performed in-line with the gathering step. Additionally, the reinforcing fibers and matrix fibers may be commingled to provide the plurality of fibers. The applying step may involve simultaneously coating the reinforcing fibers and the matrix fibers with the chemical treatment.

Additionally, the invention relates to apparatus for carrying out the above methods.

The invention also relates to a chemical treatment for applying to fibers for processing into a composite strand useful for disposing in a matrix material to form a fiber-reinforced composite article, the chemical treatment comprising: a film former comprising at least one of a multifunctional monomer and a low molecular weight monofunctional monomer; and a coupling agent comprising a functionalized organic substrate. The chemical treatment is thermosetting, at least partially heat curable, substantially solvent-free, and substantially non-photosetting. Optionally, the treatment may include a processing aid, e.g., an epoxy-functional viscosity modifier or butoxyethylstearate. In a preferred embodiment, the chemical treatment is heat-curable at a temperature of from about 150° C. to about 350° C. The film former may comprise a monomer selected from polyester alkyds, epoxy resins, and compounds containing glycidyl ether functional groups. The film former may also comprise at least one member selected from urethanes, vinyl esters, amic acid, Diels Alder reactive species, and Cope-rearranging compounds. Preferably, the chemical treatment has a viscosity of up to about 300 centipoise (cps) at a temperature in the range of from about 93° C. to about 110° C.

Furthermore, the invention relates to a chemical treatment for applying to fibers for processing into a composite strand useful for disposing in a matrix material to form a fiber-reinforced composite article, the chemical treatment comprising a film former comprising at least one low molecular weight thermoplastic polymer material and a coupling agent comprising a functionalized organic substrate, wherein the chemical treatment is thermoplastic, substantially solvent-free, and substantially non-photosetting. Optionally, the treatment may comprise a processing aid. The low molecular weight thermoplastic polymer may include a cracked polyester or polyamide, with the polyester or polyamide preferably selected from polyethylene terephthalate, polybutylene terephthalate, and nylon. In a preferred embodiment, the treatment comprises a processing aid including a monomer equivalent selected from di-n-butyl terephthalate, dibenzoate ester of 1,4-butanediol, diethyl terephthalate, dibenzoate ester of ethylene glycol, caprolactone, adduct of adipoylchloride and n-aminohexane, and adduct of 1,6-hexanediamine and hexanoylchloride. Preferably, the chemical treatment has a viscosity of up to about 300 cps at a temperature in the range of from about 93° C. to about 110° C.

Other objects, features, and advantages of the various aspects of the present invention will become apparent from the detailed description of the invention and its preferred embodiments in conjunction with the appended drawings.

DETAILED DESCRIPTION AND PREFERRED EMBODIMENTS OF THE INVENTION

Solvent-Free Chemical Treatments

Figure 1:
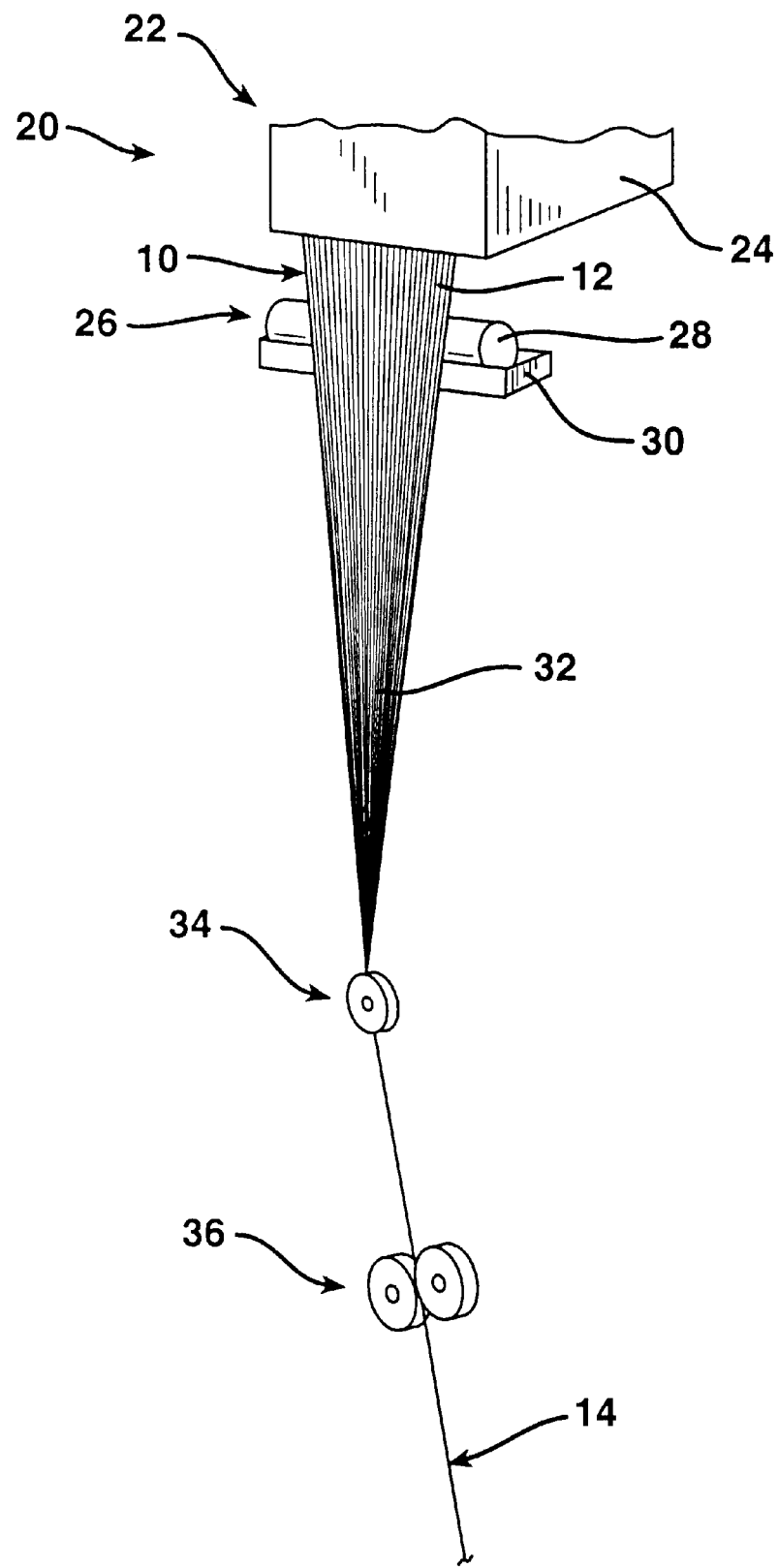
FIG. 1 is a perspective view of one embodiment of an apparatus for chemically treating fibers continuously formed from a molten material and suitable for making a composite article.

One general aspect of the invention relates to essentially solvent-free chemical treatments for applying to fibers to be processed into composite articles. One or more chemical treatments can be applied to the fibers, such as with one or more conventional applicators, so as to size and/or preimpregnate a sufficient number of the reinforcing fibers to obtain the composite properties desired.

More particularly, fibers or filaments are sized and/or preimpregnated with a chemical treatment. The chemical treatment has a low viscosity, is substantially free of an unreactable solvent, and is not cured by actinic radiation. The low viscosity may be obtained by choosing relatively low molecular weight constituents for the chemical treatment.

Heat energy may be used to lower the viscosity and improve the wetting ability of the chemical treatment after the treatment is applied to the fibers. Additionally or alternatively, heat energy may be used to increase the molecular weight of, or otherwise cure (i.e., crosslink or otherwise increase the molecular weight of), the applied chemical treatment. Alternatively, no heat energy may be supplied to the applied chemical treatment. Regardless of whether heating is employed, there is little, if any, generation of water vapor, volatile organic carbon (VOC) vapor, or other solvent vapor.

The resulting chemically treated fibers are suitable for forming a composite strand, e.g., a preimpregnated strand ("prepreg"). The composite strand may be subsequently processed in-line or off-line into a composite article having reinforcing fibers disposed in a polymeric matrix material.

An apparatus suitable for making one or more composite strands in thread or pellet form suitable for being molded into a fiber-reinforced thermoplastic composite article includes a source of reinforcing fibers and, optionally, a source of one or more other types of fibers. One such source is a bushing of molten reinforcing material (e.g., glass) from which continuous reinforcing fibers can be drawn in sufficient numbers to form at least a portion, if not all, of the strand. It may also be desirable for the source of reinforcing fibers to be one or more spools or other packages of preformed reinforcing fibers. A source of preformed reinforcing fibers may be used in combination with a source of continuously formed reinforcing fibers. The source of fibers can also include matrix fibers that are continuously produced, for example, from a bushing or spinner and/or are preformed and provided in suitable packaging, such as spools.

Where glass reinforcing fibers are being formed, the fiber-forming mechanism forms the fibers from a source of molten glass fiber material, such as a conventional glass fiber-forming bushing. The fiber-forming operation may be conducted off-line from or in-line with the balance of the apparatus. When the fibers being formed are glass reinforcing fibers, the fiber-forming mechanism forms the fibers from a source of molten glass reinforcing fiber material. In one embodiment, the fiber-forming mechanism forms the fibers such that they emanate heat energy for a time after being formed.

An applicator is used for applying the chemical treatment to substantially all of the fibers. The applicator can be of a conventional or any other construction suitable for applying the desired type and amount of chemical treatment. The applicator may be disposed in-line with the fiber-forming mechanism for applying a chemical treatment to the fibers to form a plurality of coated fibers. The applicator applies the chemical treatment, which is substantially free of solvent and substantially non-photosetting.

One embodiment of the apparatus includes an applicator system that applies the chemical treatment when the fibers are at a higher temperature than that of the applied chemical treatment. When the chemical treatment is applied, the fibers are at a sufficiently higher temperature to provide enough heat energy to cause the applied chemical treatment to lower its viscosity or heat cure at least partially (e.g., if the chemical treatment is a thermoset), or both. The temperature of the fibers when the chemical treatment is applied, however, is not sufficient to cause significant decomposition of the applied chemical treatment. The difference in the temperatures of the applied chemical treatment and the fibers on which the treatment is being applied may be obtained by including a heat retainer as part of the applicator system. This difference in temperatures may also be obtained by disposing the applicator close enough (e.g., adjacent) to the fiber-forming mechanism so that the fibers are at a sufficiently higher temperature than the chemical treatment when it is applied. Such an applicator system may include a heat retainer disposed so as to help maintain the temperature of the fibers, or at least reduce the rate of temperature drop, during and/or after the chemical treatment is applied.

A gathering shoe or some other gatherer or bundler is used to gather the treated fibers together into at least one strand. The strand may then be coated or encased with a suitable polymeric material, preferably a thermoplastic, and formed into the desired composite article.

The material used to coat or encase the chemically treated strand can be provided from a source of molten thermoplastic material, such as from an extruder. To coat the treated strand and form an encased composite strand, the treated strand may be pulled or otherwise passed through a suitable coating device. For example, encased composite strands can be formed by pulling or otherwise passing a number of the strands through a corresponding number of dies, with each die having at least one exit orifice sized to form the coating into a thermoplastic sheath of the desired thickness (e.g., that yielding a thermoplastic-to-glass weight ratio of from about 30:70 to about 70:30).

Preferably, a wire coater is used to encase the strands. A wire coater is a device or group of devices capable of coating one or more strands with a plastic material so as to form a sheath of relatively uniform thickness on each strand. Preferably, the wire coater includes some form of a die that shapes the sheath to the desired uniform thickness and/or cross-section.

The strand is fed or passed through the coating device using a suitable device. For example, a puller may be used to pull the strand through the wire coater. This puller can be separate from or part of the wire coater. A chopper may be adapted to also function as a puller or aid the puller in pulling the strand through the wire coater.

The resulting coated or encased composite strand can be cut or otherwise separated into discrete lengths to form a plurality of encased composite pellets, or wound or otherwise packaged to form an encased composite thread. The chemical treatment helps keep the fibers together in each polymer-encased composite pellet or thread.

A composite article can be made by molding one or more of the encased composite strands, e.g., in pellet, thread, or other form. The sheaths of the encased composite strands form at least part, and may form all, of the matrix of the composite article to be molded. Exemplary molding processes used to form the composite article include injection molding, compression molding, and other suitable molding techniques.

Figure 2:
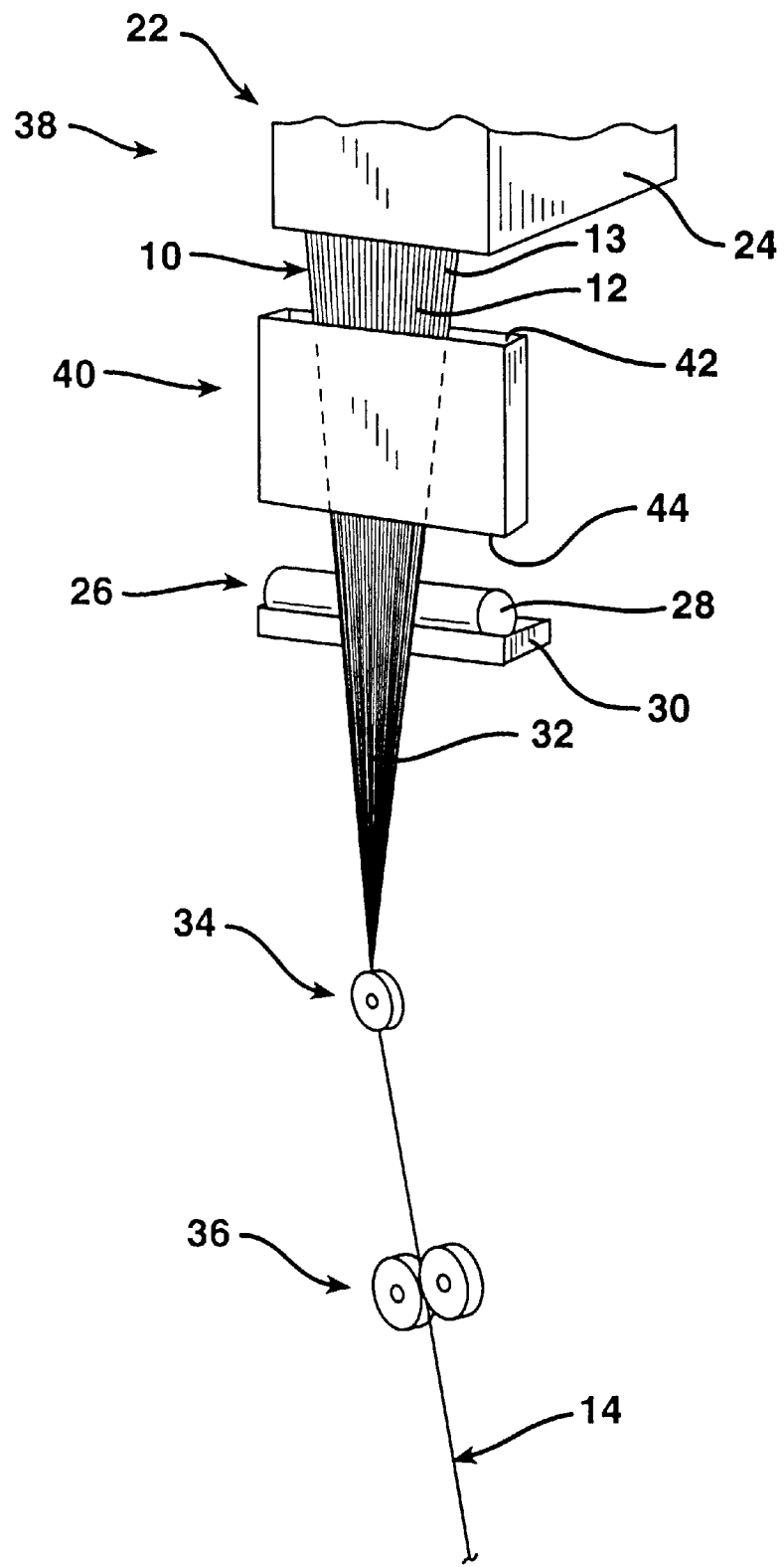
FIG. 2 is a perspective view of another embodiment of a system for chemically treating fibers, where a heat retainer is disposed between a fiber-forming mechanism and a chemical-treatment applicator.
Figure 3:
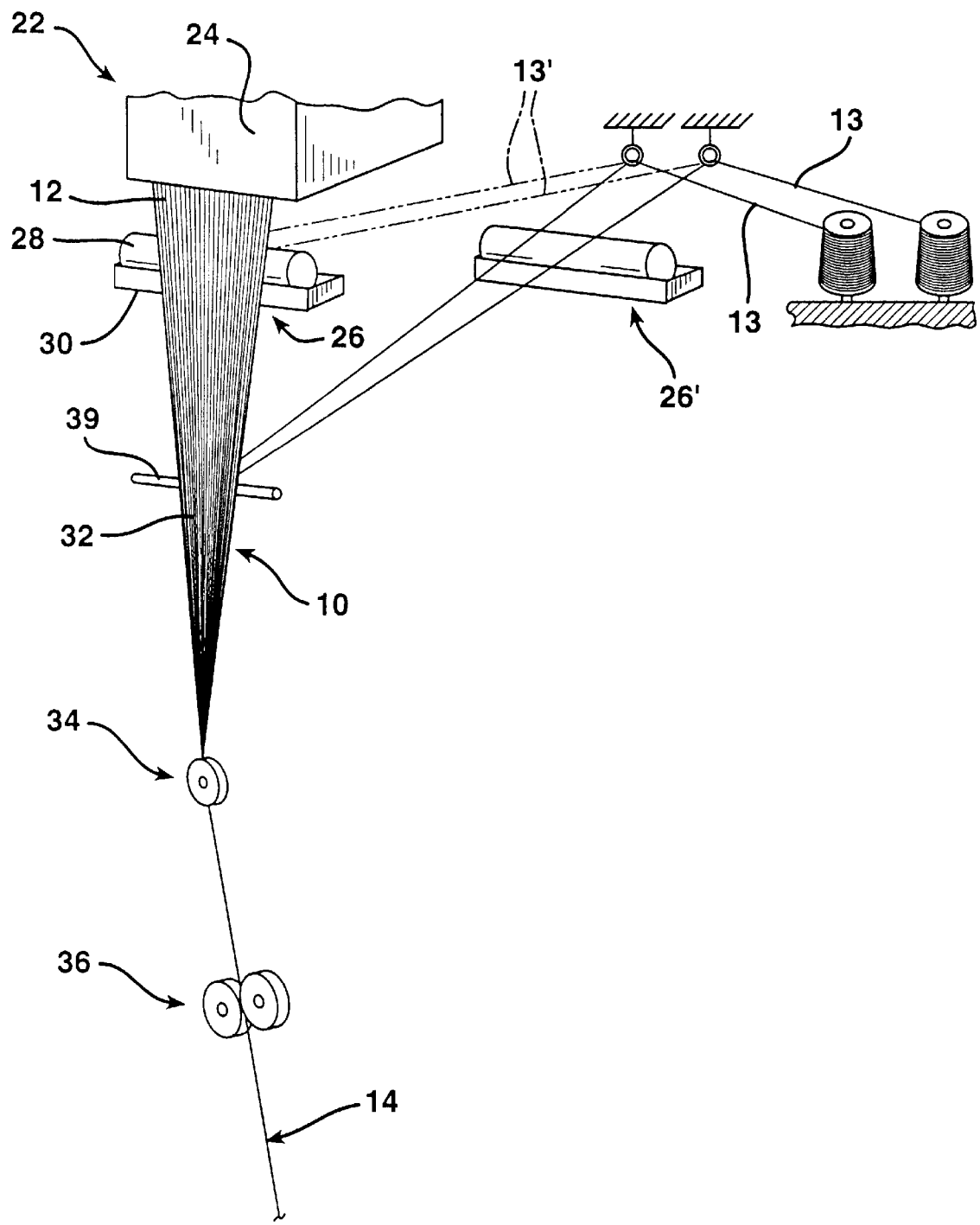
FIG. 3 is a perspective view of an additional embodiment of an apparatus for chemically treating fibers continuously formed from a molten material and preformed fibers pulled from packages.

FIGS. 1–3 illustrate a preferred embodiment for chemically treating a plurality of fibers 10 suitable for making a composite article. A typical composite article comprises a plurality of reinforcing fibers 12 disposed in a matrix of polymeric material.

In addition to reinforcing fibers 12, the fibers 10 may also include other types of fibers suitable for making a composite article, such as matrix fibers 13. The matrix fibers 13 are preferably made from a polymeric matrix material and form at least part of the matrix. The reinforcing fibers 12 may be glass, which may be continuously drawn from a source of molten glass reinforcing material (e.g., a conventional glass fiber-forming bushing as shown in FIGS. 1 and 2). Continuously formed glass reinforcing fibers are especially advantageous since heat energy remaining in the glass fibers from the forming process may be employed to efficiently provide heat to the applied chemical treatment. In addition to or instead of using continuously formed glass fibers, the reinforcing fibers 12 may include preformed reinforcing fibers made from glass and/or synthetic reinforcing materials.

The term "preformed" refers to fibers that are formed off-line before being supplied or provided with a chemical treatment in accordance with the present invention. The term "glass" means an inorganic product of fusion that solidifies to a rigid, noncrystalline condition upon cooling, and is intended to include common silicate glasses as well as glassy mineral materials suitable for making reinforcing fibers, such as borosilicate glass, glass wool, rock wool, slag wool, and mineral wool. Contrastingly, "synthetic" reinforcing materials are non-glass materials, such as KEVLAR®, carbon or graphite, silicon carbide (SiC), and other non-glass materials having suitable reinforcing characteristics. When fibers made from different materials are used, it is contemplated that the same or a different chemical treatment can be used for each type of fiber.

In one embodiment, the chemical treatment is applied according to methods and using apparatus which use heat energy to effect at least one of two changes in the applied chemical. Heat energy may be used to lower the viscosity, which improves the wetting ability of a chemical treatment that has been applied to the fibers. Alternatively or additionally, heat energy may be used to increase the molecular weight of, or otherwise cure, the applied chemical treatment. FIGS. 1 and 2 depict exemplary embodiments of apparatus and methods for applying the chemical treatments.

The chemical treatment used to coat fibers 10 has a relatively low molecular weight and viscosity compared to the matrix material, and is also substantially free of an unreactable solvent. An "unreactable solvent" (e.g., water and certain organic solvents) is a solvent that evaporates out of the chemical treatment in the presence of heat energy rather than reacts with a constituent of the chemical treatment or the matrix material. The chemical treatment is substantially "solvent-free"—i.e., essentially free of such a substantially unreactable solvent. Thus, there may be traces of an unreactable solvent in the chemical treatment, but the amount of the solvent present is not enough, by itself, to significantly lower the viscosity of the chemical treatment (i.e., affect the ability of the chemical treatment to wet the fibers). In addition, the applied chemical treatment is sufficiently free of any unreactable solvents such that no substantial amount of water vapor, VOC vapor, or other solvent vapor is generated when the chemical treatment is heated, including during molding of the composite article. By being solvent-free, the present chemical treatment can have its viscosity reduced and/or be heat-cured without experiencing a substantial drop in mass. Thus, most of the chemical treatment that is applied to the fibers 10 remains on the fibers.

That the chemical treatment is solvent-free, however, does not preclude the use of one or more additives in the chemical treatment that are soluble or compatible with the other ingredients (e.g., the coupling agent). For example, a compatible viscosity modifier, such as a HELOXY® (epoxy functional modifier) product available from Shell Chemical Company, e.g., a diglycidyl ether of 1,4-butanediol (HELOXY Modifier 67) or a polyglycidyl ether of castor oil (HELOXY Modifier 505), can be used in a film-former system to interact or react one or more other ingredients to lower the viscosity of the chemical treatment, instead of being driven off in the form of a vapor when in the presence of heat energy.

The chemical treatment is also not curable by actinic radiation (i.e., is non-photosetting) to any substantial degree. That is, the chemical treatment does not photochemically react to cure or significantly increase in viscosity due to the effect of actinic radiation.

The chemical treatment, which may be thermosetting or thermoplastic in nature, is used for sizing and/or preimpregnating the number of reinforcing fibers 12 needed to obtain the composite properties desired. The chemical treatment may also be used for sizing and/or preimpregnating other types of fibers 10, such as fibers 13 made from a polymeric matrix material.

Matrix fibers may be either continuously formed in-line or preformed, and are subsequently used to form part or all of the matrix of the composite article. Where matrix fibers are used, the step of applying the chemical treatment can include sizing and/or preimpregnating the matrix fibers with the same or a different chemical treatment than that applied to the reinforcing fibers.

In most cases preimpregnation as well as sizing is desired, and therefore it is preferable for the same chemical treatment to be used for both sizing and preimpregnating the fibers 10. Optionally, however, one chemical treatment may be used to size the reinforcing and/or matrix fibers, and another chemical treatment may be used to preimpregnate the reinforcing and/or matrix fibers. If different types of matrix fibers are used, it may be preferable for a different chemical treatment to be applied to each type of matrix fiber.

Sizing fibers involves applying at least a monolayer of the chemical treatment onto the surface of each fiber. Glass reinforcing fibers 12 are generally considered sized when a chemical treatment content of from 0.1% to 1%, e.g., on the order of about 0.5%, by weight based on the total weight of the treated fibers, is applied onto the fibers 12. Preimpregnating involves coating or otherwise applying a sufficient amount of the chemical treatment to a plurality of fibers to substantially fill in the spaces between the fibers when the fibers 10 are formed into a bundle or strand 14. A bundle or strand 14 of glass reinforcing fibers 12 is generally considered preimpregnated when the strand 14 has a chemical treatment content of from about 2% to about 25% by weight.

The fibers may be sized without being preimpregnated at the same time, for example, when the chemical treatment is applied in a low quantity and/or when it has a sufficiently low viscosity. The viscosity of a chemical treatment may be adjusted by adjusting its temperature. For example, the viscosity of the treatment may be suitably adjusted after it is applied by employing the heat present in the fiber.

Preferably at least the reinforcing fibers 12 of the strand fibers 10 are coated with a chemical treatment in an amount of from about 2% to about 15% by weight, more preferably from about 5% to about 15% by weight, and even more preferably with about 8% by weight (based on the weight of the treated fibers). A conventional loss on ignition (LOI) method can be used to determine how much of the applied chemical treatment is on the fibers 12, which are preferably glass.

A preferred LOI range or value is the one that gives the desired composite strand properties at the lowest cost. At an LOI value of 8%, sample strands 14 have been found to be well impregnated but not wet to the touch. LOI values that are too low may cause fizzing of the strand 14 (i.e., breakage of a number of individual glass fibers in the strand) in subsequent in-line or off-line processing and handling. But the more chemical treatment added, the more the final product will cost. Higher LOI values may also bleed low viscosity components out of the strand 14. In any event, an LOI value of from about 25% to about 40% by weight is preferred for making a composite article with all the matrix polymer being provided by the composite strand 14.

Thus, fibers 10 can be chemically treated in accordance with the present invention to form a prepreg (preimpregnated composite strand) 14, or a composite strand 14 that contains only sized fibers 10. One or more of the composite strands 14 can be subsequently processed, in-line or off-line, into a variety of composite articles. For example, the step of forming the composite strand may be accomplished in-line with a gathering step. Exemplary composite articles into which a strand 14 may be formed include a mat, fabric, sheet, panel, filament-wound pipe, pultruded article (pultrusion), or spray-up article (gun roving). The strands 14 may also be chopped into lengths or pellets suitable for use in injection or other molding processes to form composite articles.

Generally, a chemical treatment according to the present invention comprises a film former and a coupling agent. The film former forms a layer of polymeric material around each fiber coated with the chemical treatment. The coupling agent helps bond or otherwise couple the film former to at least the reinforcing fiber. The coupling agent, if appropriate, can also be chosen to help the film former react or interact with the polymeric matrix material.

The applied chemical treatment behaves as a thermoset or a thermoplastic. Also, the treatment can have both thermosetting and thermoplastic components—e.g., the treatment may contain a substantially thermoplastic polymer with reactive end groups that can participate in a thermosetting/ curing reaction. The film former used in either type of chemical treatment may be the same polymeric material as that used for the composite matrix.

A thermosetting-type chemical treatment is partially or fully heat-curable and substantially non-photosetting, and may be used with a polymeric matrix material that is either a thermoset or is thermoplastic. If the chemical treatment behaves as a thermoset, applied heat energy may at least partially cure and cause an increase in the viscosity of at least the portion of the applied chemical treatment being cured. A preferred chemical treatment is heat-curable at temperatures of about 350° C. (662° F.) and below.

In exemplary thermosetting-type chemical treatments, the film former preferably comprises either one or more relatively low molecular weight mono-functional monomers, one or more relatively low or high molecular weight multi-functional monomers, or a combination thereof. A mono-functional monomer has one reaction site per molecule, while a multi-functional monomer has two or more reaction sites per molecule. The monomer is heat-curable without generating a substantial amount of water vapor, volatile organic carbon vapor, or other solvent vapor. For example, the film former used in a thermosetting-type chemical treatment may include at least one low molecular weight functional monomer from the group including, e.g., a polyester alkyd, an epoxy resin, and a combination of glycidyl ether functional groups sufficient to form a film on each fiber yet not constitute an epoxy resin. Other suitable functional monomers for use as all or part of a film former include urethane, vinyl ester, amic acid, Diels Alder reactive species (such as dienes or dieneophiles), and molecules that can undergo Cope rearrangement. The molecular weight of the functional monomers is suitably low compared to the matrix material to obtain a chemical treatment having a low viscosity.

In exemplary thermoplastic-type chemical treatments, the film former preferably comprises at least one low molecular weight thermoplastic polymeric material which has a relatively low viscosity at elevated temperatures. Thermoplastics usually have relatively high molecular weights, and thus high viscosities, compared to typical uncured thermosets. However, such high molecular weight thermoplastics may still be used in the film former of a thermoplastic-type chemical treatment if cracked or otherwise processed to a sufficiently low molecular weight. High molecular weight thermoplastics, for example, polyethylene terephthalate (PET), polybutylene terephthalate (PBT), other polyesters, and polyamides such as nylon may be adequately cracked for this purpose.

Some thermoplastics even when cracked may have an undesirably high viscosity. In such cases, a processing aid or a viscosity modifier may be used in the film-former system. For instance, a monomer equivalent of the thermoplastic material, or a mixture of a monomer equivalent and an oligomer (e.g., a cracked thermoplastic material), may be used as a processing aid with a high molecular weight thermoplastic. Exemplary thermoplastic monomer equivalents include di-n-butyl terephthalate and the di-benzoate ester of 1,4-butanediol for PBTs; diethyl terephthalate and the dibenzoate ester of ethylene glycol for PETs; and caprolactone, the adduct of adipoylchloride and n-aminohexane, and the adduct of 1,6-hexanediamine and hexanoylchloride for nylons. In these examples, the monomer equivalent molecules may act as processing aids to allow high molecular weight thermoplastics such as PBT, PET, and nylon to form at least part of the film former in the chemical treatment.

The above exemplary monomer-equivalent processing aids may be used with other thermoplastics, and/or they may be made reactive and used with thermosets or thermoplastics. Satisfactory results have been obtained using butoxyethylstearate (BES) as a processing aid in the BES-containing chemical treatments described in the examples below for thermoset matrices. Preferably, such processing aids contain the same kinds of functional groups as the matrix polymer. There may be myriad molecules and/or combinations of molecules that may be useful as monomer equivalent processing aids.

If the chemical treatment behaves as a thermoset, a step of heating is preferably used to at least partially cure the applied chemical treatment and cause an increase in the viscosity of at least the portion of the applied chemical treatment being cured (i.e., the part most directly exposed to the heat). This increase in viscosity can be caused by an increase in molecular weight as the thermoset-type chemical treatment cures. The thermosetting-type film former is heat-curable without generating a substantial amount of solvent vapor when heated. Preferably, the functional monomers used for the film former are heat-curable at temperatures of about 350° C. (662° F.) and below, because the risk of permanent degradation increases to an undesirable degree for many chemical treatments at temperatures of above about 350° C. (662° F.).

If the applied chemical treatment behaves as a thermoplastic, the heating can cause a decrease in the viscosity of at least the portion of the applied chemical treatment most directly exposed to the heat (e.g., adjacent to a hot fiber). If the viscosity is lowered during the heating step, preferably there is enough of a drop in viscosity to improve as desired the ability of the applied thermoplastic-type chemical treatment to wet the fibers 10 (to coat the fibers and interact with the fiber surface). The wetting of the applied chemical treatment on the fibers 10 is more likely to improve when a drop in viscosity occurs for at least the portion of the applied chemical treatment located adjacent to the fiber surface. To reduce the chance of permanent degradation while being heated, it is also preferable for the thermoplastic-type film former in particular, and for the thermoplastic-type chemical treatment as a whole, to exhibit a sufficiently low viscosity at temperatures of about 350° C. (662° F.) and below.

The viscosity of either type of chemical treatment is low enough to at least partially, if not fully, wet the fibers 10 when the chemical treatment is initially applied. To be able to apply the chemical treatment using conventional equipment (e.g., with a standard single- or dual-roll applicator 26) without causing the fibers 10, in particular glass fibers, to break in significantly high numbers, the chemical treatment preferably has a viscosity of about 1000 cps or less before being applied. The lower the viscosity of the chemical treatment being applied, the faster the fibers 10 can be processed without causing significant fiber breakage. Thus, more preferably the chemical treatment before being applied has a viscosity of about 300 cps or less. In a preferred embodiment for advantageous processing of the fibers 10, the chemical treatment as it is applied has a viscosity on the order of about 50 cps, more preferably of about 10 cps, as measured by a conventional viscometer (e.g., a Brookfield or ICI viscometer).

The following are specific examples of film formers divided into two main categories: liquid and meltable. In the "liquid" category, there are three examples of maleate-based film formers that have been synthesized. In addition, there are twelve epoxy-based film formers prepared from commercially available ingredients. There is another liquid film former (allyl propoxylate urethane) which can be used in either a thermoset-type or a thermoplastic-type chemical treatment. In the "meltable" category there are two film-former systems, each prepared from a commercially available polycaprolactone and one of the liquid film formers. The exemplary polycaprolactone system is a solid polymer at room temperature. These exemplary film formers are all processable in accordance with the present invention.

EXAMPLES 1–6

Liquid Film Formers

Example 1

Propyleneglycol-Fumarate

A conventional ten-gallon stainless steel reactor was charged with 17.02 kg of propylene glycol (available from Ashland Chemical Company of Columbus, Ohio) and 12.98 kg of fumaric acid (available from Huntsman Specialty Chemical of Salt Lake City, Utah). For stability, 3.62 g (120 ppm) of toluhydroquinone (THQ) (available from Aldrich Chemical Company of Milwaukee, Wis.) was added into the reactor. The molar ratio of the charge was 2:1 propylene glycol (PG) to fumaric acid (FA). The mixture was heated under a nitrogen atmosphere at 380° F. (193° C.) for five hours. The endpoint of the reaction was determined by the viscosity of the PG-FA product, which was 360 to 450 cps at 120° F. (49° C.) as determined by a cone-and-plate viscometer, such as that made by ICI of Wilmington, Del. The acid value at the reaction endpoint is typically observed to be 10 to 36 Meq KOH/g of alkyd (milliequivalent of potassium hydroxide per gram of alkyd). This material may be used directly as a film former.

Example 2

Propoxylated Bisphenol-A-Maleate

A 50-gallon stainless steel reactor was charged with 159.68 kg of propoxylated bisphenol-A (available from Milliken Chemical of Inman, S.C.) and 20.33 kg of maleic anhydride (available from Huntsman Specialty Chemical). For stability, 18 g (100 ppm) of hydroquinone (HQ) (available from Aldrich Chemical Company) was added to the reactor. The mixture was heated under a nitrogen atmosphere at 175° F. (79° C.) for 2.5 hours, then at 275° F. (135° C.) for 3.5 hours. The endpoint of this reaction was determined by acid value—the reaction was considered to be complete when the acid value reached a level of 63.6 Meq KOH/g of alkyd and no more maleic anhydride was observed by infrared spectroscopy. The viscosity of this product ranges from 100 to 130 cps at a temperature of 200° F. (93° C.) as measured by an ICI cone-and-plate viscometer. This material may be used directly as a film former.

Example 3

Propoxlated Allyl Alcohol-Maleate

A 15-gallon stainless steel reactor was charged with 15.49 kg of propoxylated allyl alcohol (available from Arco Chemical Company of New Town Square, Pa.) and 9.88 kg of maleic anhydride (available from Huntsman Specialty Chemical). For stability, 2.53 g (100 ppm) of HQ was added to the reactor. The mixture was heated under a nitrogen atmosphere at 250–300° F. (121–149° C.) for four hours. The reaction endpoint was when the acid value reached a level of 263.4 Meq KOH/g of alkyd and no more maleic anhydride was observed by infrared spectroscopy. The viscosity of this product ranges from 100–130 cps at a temperature of 200° F. (93° C.) as measured by an ICI cone-and-plate viscometer. This material may be used directly as a film former.

Examples 4A–K

Low-Viscosity Epoxy Systems

A typical epoxy-based film former contains one or more epoxies that are available from Shell Chemical Company, e.g., EPON Resin 8121, EPON Resin SU-2.5, EPON Resin 160, HELOXY Modifier 62 (cresyl glycidyl ether), HELOXY Modifier 67 (diglycidyl ether of 1,4-butanediol), and HELOXY Modifier 505 (polyglycidyl ether of castor oil). All of the epoxy-based film-former systems listed below have a viscosity below 50 cps at room temperature. The specified percentages are in weight percent (all percentages and ratios given throughout this specification are by weight, unless indicated otherwise).

(A) 100% HELOXY Modifier 67
(B) 98% HELOXY Modifier 67, 2% HELOXY Modifier 62
(C) 90% HELOXY Modifier 67, 10% HELOXY Modifier 62
(D) 98% HELOXY Modifier 67, 2% EPON Resin 160
(E) 90% HELOXY Modifier 67, 10% EPON Resin 160
(F) 98% HELOXY Modifier 67, 2% EPON Resin SU-2.5
(G) 90% HELOXY Modifier 67, 10% EPON Resin SU-2.5
(H) 97% HELOXY Modifier 67, 3% HELOXY Modifier 505
(1) 100% HELOXY Modifier 62
(J) 70% HELOXY Modifier 62, 30% EPON Resin 8121
(K) 65% HELOXY Modifier 62, 30% EPON Resin 8121, 5% EPON Resin SU-2.5

Example 5

High Viscosity Epoxy

In addition to the above-noted epoxy systems, an exemplary higher temperature, higher viscosity epoxy film-former system is a one-to-one mixture of DER 337 epoxy resin (available from Dow Chemical) and Araldite GT7031 (available from Ciba-Geigy Corp. of Switzerland). This film former has a viscosity of 350–450 cps at 200° F. (93° C.) as determined using a Brookfield viscometer.

Example 6

Allyl Propoxylate Urethane

A 12-liter three-neck, round-bottom glass reactor equipped with a heating mantle, a Freidrich condenser, a 1-liter addition funnel, an electric overhead stirrer, and a thermocouple temperature probe was charged with 3.63 kg (21.6 mol) of Desmodur H (hexamethylenediisocyanate, available from Bayer Chemical of Pittsburgh, Pa.). To this was added 0.5 g (50 ppm) of dibutyl tin dilaurate (available from Aldrich Chemical Company). Next, 6.37 kg (43.6 mol) of ARCAL Allyl Proproxylate 1375 (propoxylated allyl alcohol, available from Arco Chemical Company) was added via the addition funnel. The allyl propoxylate was added dropwise and the temperature was maintained at 80° C. by varying the addition rate and the temperature of the heating mantle. When the addition was complete, the temperature of the reactor contents was maintained at 80° C. for three (3) hours or for a time until the 2200 wave number peak in the infrared spectrum of the reaction mixture, corresponding to the isocyanate groups of the Desmodur H, disappeared. This film former may be used directly without any purification or further manipulation.

EXAMPLES 7 AND 8

Meltable Film Formers

Example 7

Propoxlated Bisphenol—A Maleate/TONE 0260

The propoxylated bisphenol-A maleate from Example 2 was mixed with TONE 0260 (a polycaprolactone polymer available from Union Carbide) in a weight ratio of one-to-one. This mixture is a solid at room temperature, but has a viscosity of 50–250 cps at a temperature of 200–230° F. (93–110° C.).

Example 8

Propoxlated Allyl Alcohol Maleate/TONE 0260

The propoxylated allyl alcohol maleate from Example 3 was mixed with TONE 0260 in a weight ratio of 1:1. This mixture is a solid at room temperature, but has a viscosity of 50–250 cps at a temperature of 200–230° F. (93–110° C.).
Optional Ingredients In addition to or instead of other viscosity modifiers such as those mentioned above, n-butyl amic acid may also be used as a modifier where it is suitably reactive with either thermoplastic or thermosetting materials to lower the viscosity of the film former and the overall chemical treatment. A preferred amic-acid reactive modifier was prepared as follows:

A 2-liter three-neck, round-bottom glass reactor equipped with a heating mantle, a Freidrich condenser, a 1-liter addition funnel, an electric overhead stirrer, and a thermocouple temperature probe was charged with 150 g (1.53 mol) of maleic anhydride (available from Huntsman Specialty Chemical) and 0.02 g of hydroquinone (available from Aldrich Chemical Co.). These solids were dissolved by the addition of 350 ml of acetone (high-purity grade available from Aldrich Chemical). The solution of maleic anhydride and hydroquinone was stirred in the reactor. A solution of 111 g (1.51 mol) of n-butyl amine (available from Aldrich Chemical) in 150 ml of acetone was added to the reactor. The n-butyl amine solution was added dropwise, and the temperature was maintained at 55° C. by varying the addition rate and the temperature of the heating mantle. Once the addition was complete, the temperature of the reactor and contents was maintained at 60° C. for three hours. The acetone was then removed at reduced pressure and 60° C. by rotary evaporation. The solid n-butyl amic acid product was removed from the reactor as a liquid at 90° C., which may be used directly without further purification or manipulation. A small portion of the n-butyl amic acid produced was recrystallized from acetone. The melting point of the recrystallized material was 74.9° C. by differential scanning calorimetry (DSC).
Coupling Agents For either a thermosetting or thermoplastic chemical treatment, the coupling agent comprises a functionalized organic substrate (i.e., at least one organic functional group bonded to an organic substrate). Exemplary types of functionalized organic substrates include alcohols, amines, esters, ethers, hydrocarbons, siloxanes, silazanes, silanes, lactams, lactones, anhydrides, carbenes, nitrenes, orthoesters, imides, enamines, imines, amides, imides, and olefins. The functionalized organic substrate is capable of interacting and/or reacting with the surface of the fibers at elevated temperatures (preferably, of from about 100° C. (212° F.) to about 350° C. (662° F.)) so as to produce sufficient coupling or bonding between the reinforcing fibers and matrix material to achieve the desired properties. Interaction involves bonding resulting from an attracting force, such as hydrogen bonding or Van der Waals bonding. Reacting involves chemical bonding, which is typically covalent bonding. The functionalized organic substrate can also be interactive or reactive with the matrix material. Exemplary coupling agents include silanes such as gamma-aminopropyltriethoxysilane (A-1100), gamma-methacryloxypropyltrimethoxysilane (A-174), and gamma-glycidoxypropyltrimethoxysilane (A-187), which are all available from Witco Chemical Company of Chicago, Ill. Non-silane coupling agents may also be used. By choosing one or more suitable functionalized organic substrates for the coupling-agent system, the desired mechanical properties between the reinforcing fibers and the matrix material in the composite article can be obtained.

While not intending to be limited to any theory regarding the chemical treatments, a possible explanation of how the treatments may operate is provided below. Silane-type coupling agents are typically found in aqueous-based chemical treatments. Under a current view, with a conventional silane-type coupling agent the alkoxysilane portion of the molecule undergoes hydrolysis to become a hydroxysilane or silanol to water-solubilize the coupling agent. One end of the molecule reacts or interacts with the glass surface and the other end of the molecule reacts or interacts with the matrix material. More particularly, coupling agents that have typically been used in the glass industry are organosilanes, which have an organic portion thought to react or interact with the matrix polymer and a silane portion, or more specifically a silanol portion, thought to react or interact with the glass surface. Also, in some cases, it is generally accepted that the organic portion of an organosilane is capable of reacting (e.g., covalent or ionic bonding) or interacting (e.g., hydrogen or Van der Waals bonding) with the glass surface. In general, hydrogen bonding and other associations are thought to be thermodynamic (reversible under mild reaction conditions) processes. In some cases, such as when silanols bond to a glass surface, chemical bonding is considered a thermodynamic process. Thus, with previous coupling-agent technology, the bonding of aqueous-based chemical treatments to the glass occurs as a thermodynamic process. This is because conventional processes are usually conducted under relatively mild conditions and are usually reversible to a substantial degree. In a conventional process, after the glass fibers are coated with an aqueous-based chemical treatment, the coated fibers are packaged and dried in an oven. While in the oven there is a potential for some of the organic functional groups of the coupling agent to react irreversibly with some of the organic functional groups in the film former. This does not happen to any great extent, however, because the oven temperatures typically being used, about 150–190° F. (66–88° C.), are not high enough.

Contrastingly, with the solvent-free chemical treatments according to the present invention, the bonding or coupling process becomes more kinetic in nature. That is, the bonding may occur under relatively harsh conditions (e.g., at higher temperatures) and may involve a substantially irreversible reaction. Moreover, in addition to a coupling agent bonding to the fiber surface, an interphase region can now be formed between the reinforcing fibers and the matrix material of the composite article. The interphase region is formed, at least in part, by the applied chemical treatment. The interphase region may also include, in whole or in part, a region around the fiber where the chemical treatment and the matrix material have interacted and/or reacted with one another. The chemical treatment may also become completely dispersed or dissolved in the surrounding matrix material.

Although conventional silane coupling agents may be used in the present chemical treatments, it is believed that the mechanism of their interaction or reaction with the glass surface differs from that which occurs in prior processes. Since there is essentially no water present during the present processing, the alkoxysilanes react directly with the glass surface to give a siloxane linkage and liberate alcohol. Indeed, there is experimental evidence (proton NMR data) that suggests that the alkoxysilanes do not hydrolyze in the present chemical treatments under the conditions to which they are exposed when processed in accordance with the invention. It is believed that the alkoxysilane group of the coupling agent used in the present chemical treatments is reacting or interacting with the glass surface in a kinetic fashion to form a siloxane linkage and liberate alcohol. Thus, the present process is kinetic, rather than thermodynamic, as evidenced by the observation that good composite properties have been obtained for both thermoset and thermoplastic composites when alkoxysilane coupling agents were present in the chemical treatments according to the invention, whereas less desirable composite properties have been obtained for both thermoset and thermoplastic composites when alkoxysilane coupling agents were not present in the chemical treatments.

If an alkoxysilane coupling agent in a present chemical treatment reacts or interacts with a newly formed glass or other reinforcing fiber surface via some kinetic process, then other types of molecules containing sufficiently reactive functional groups, such as those noted above, will also react or interact with a glass or other reinforcing fiber surface via a kinetic process. Further, these same functional groups that react or interact with the glass or other fiber surface via a kinetic process may react or interact with the rest of the organic material in the chemical treatment and/or the matrix material via a kinetic process as well. This may then serve to build an interphase region at or very near the glass or other fiber surface, and may also serve to increase the average molecular weight of the chemical treatment, thereby imparting desirable physical characteristics to the resulting glass strand product. Thus, advantages of the present invention include the flexibility to use a wider variety of coupling agents and to build an interphase region between the fiber and the matrix.

For the composite article to exhibit desirable mechanical properties between the reinforcing fibers and the matrix material, the chemical treatment is preferably compatible with the matrix material of the composite article. In general, a chemical treatment is considered compatible with the matrix material if it is capable of interacting with and/or reacting with the matrix material. The film former of either type of applied chemical treatment may comprise the same polymeric material as the matrix material and be provided in an amount sufficient to form part or all of the matrix of the composite article.

The chemical treatments may be miscible in the matrix material, in whole or in part, and/or may form a separate phase from the matrix material. If a separate phase, the chemical treatment disposed around each fiber may form a plurality of separate phase regions dispersed in the matrix material and/or a single, separate phase region surrounding its corresponding fiber.

When it is desirable for the composite article to be made with one type of chemical treatment and a different type of matrix material, a thermosetting-type chemical treatment is preferably used with a thermoplastic matrix. A low molecular weight thermosetting-type chemical treatment can cure during thermoplastic processing and/or may react with the chain ends of the thermoplastic matrix material. Consequently, such types of molecules will not readily plasticize the thermoplastic matrix material. In choosing an appropriate chemical treatment, one should note that some low molecular weight thermoplastic materials can plasticize thermoplastic matrix resins when the chemical structure of the thermoplastic matrix resin and the low molecular weight thermoplastic material are very different. An example of such different thermoplastic materials is dibutylterephthalate as part of the chemical treatment and polypropylene as the matrix material.

Optionally, the chemical treatment may further comprise a compatibilizer for improving the interaction and/or reaction between the chemical treatment and the matrix material, thereby making otherwise non-compatible or less compatible polymeric components or ingredients of the treatment more compatible (e.g., more miscible) in the matrix material. When a thermosetting or thermoplastic chemical treatment is used with a thermoplastic matrix material, exemplary compatibilizers include the PBT monomer equivalents di-n-butyl terephthalate and dibenzoate ester of 1,4-butanediol; the PET monomer equivalents diethyl terephthalate and dibenzoate ester of ethylene glycol; and the nylon monomer equivalents caprolactone, the adduct of adipoylchloride and n-aminohexane, and the adduct of 1,6-hexanediamine and hexanoylchloride.

When either type of chemical treatment is used with a thermosetting matrix material, it is preferable to use a more reactive compatibilizer. For example, for a polyester or vinylester thermoset, a suitable compatibilizer is glycidyl methacrylate end-capped diacids and esters of the trimellitic anhydride system. Specific examples of suitable compatibilizers for polyester and vinylester thermosets include diallylphthalate (DAP, which is commercially available), glycidylmethacrylate-capped isophthalic acid, trimelliticanhydride-dodecinate, bis-allylalcohol adduct of terephthalic acid and $CH_3CH_2(OCH_2CH_2)_n(CH_2)_mCO_2H$, where n is an integer from 3 to 7 and m is 16 (e.g., CBA-60, available from Witco Chemical of Chicago, Ill.). For epoxy-based thermosets, esters based on glycidol may be suitable compatibilizers, such as glycidylmethacrylate by itself, diglycidylester of adipic acid, and triglycidylisocyanurate (TGIC).

The chemical treatment may also include one or more processing aids to facilitate the use of the chemical treatment at some point during the manufacturing process and/or to optimize the properties of the resulting composite article. For a thermosetting-type chemical treatment, the processing aid can include, e.g., a viscosity reducer for reducing the viscosity of the thermosetting-type chemical treatment before it is applied to the fibers. The viscosity reducer is substantially solvent-free and preferably aids the curing of a thermosetting film former. The processing aids used in the thermosetting-type chemical treatment can include, e.g., styrene and peroxide. Styrenes are preferably used to thin the film former and participate in the thermoset reaction. Peroxides preferably function as a catalyst or curing agent.

Optionally, non-aqueous versions of other types of additives typically used to size glass fibers may also be employed as processing aids in the present chemical treatments. For example, processing aids or additives may be employed to help control the lubricity of the glass tow or strand, control the relative amount of static generated, or control the handleability of the glass strand or tow product. Lubricity may be modified by adding processing aids or lubricating agents, for example, a polyethyleneglycol ester emulsion in mineral oil (e.g., EMERLUBE 7440, available from Henkel Textile Technologies of Charlotte, N.C.); polyethyleneglycols, e.g., PEG-400-MO (polyethylene glycol monooleate) and PEG-400-monoisostearate (available from the Henkel Corporation); and butoxyethylstearate (BES). These lubricating agents serve to enhance the runability of the glass by acting as lubricants, and when used judiciously should have little, if any, adverse affect on the properties of the finished composite article. Static generation may be controlled by adding processing aids such as polyethyleneimines, for example EMERY 6760-O and EMERY 6760-U (available from Henkel Corporation). Handleability may be enhanced with processing aids such as polyvinyl pyrrolidone (e.g., PVP K90, available from GAF Corporation of Wayne, N.J.), which can provide good strand integrity and cohesiveness, and wetting agents or surfactants such as PLURONIC L101 and PLURONIC P105 (both available from BASF Corporation), which can improve the ability of the matrix material to wet the fibers. Any ingredient present, however, has a formulation and is added in an amount such that the chemical treatment remains solvent-free.

Preferred embodiments of methods and apparatus for applying the inventive chemical treatments will now be further described in reference to the drawings. FIG. 1 illustrates one embodiment of an apparatus 20 for applying a chemical treatment to fibers 10 used in making a composite article, and includes a fiber-forming mechanism 22, such as a conventional glass fiber-forming bushing 24, which is operatively adapted according to well known practice for continuously forming a plurality of glass reinforcing fibers 12 from a source of molten glass material in a melter above the bushing 24. In this exemplary process, the glass reinforcing fibers 12 emanate heat energy for a time after being formed. One or more applicators 26, such as a standard single- or dual-roll style applicator 28 and pan 30, can be used to apply one of the above-described exemplary chemical treatments to the reinforcing fibers 12 in order to form a plurality of coated fibers 32. For the process to continue to run after the chemical treatment is applied, i.e., without having a substantial number of the fibers 10 break, the viscosity of the chemical treatment is made to be sufficiently low before being applied or to drop a sufficient amount after being applied as discussed above.

Two alternative processes for applying chemical treatment to newly formed glass fibers 12 are described below. Exemplary Process 1 is used when the viscosity of the chemical treatment is relatively low at relatively low temperatures (e.g., viscosities of 150 cps or less at temperatures of 150° F. (66° C.) or less). Exemplary Process 2 is employed with higher-viscosity chemical treatments. Chemical treatments which include one of the film formers from the above Examples 1–4(K) and 6 may be used in Process 1. Chemical treatments which include one of the film formers from Examples 5, 7 and 8 may be used with Process 2. Any chemical treatment used in Process 1 can also be used in Process 2. Any chemical treatment that can be used in either Process 1 or Process 2 may also be used in Process 3, which is another exemplary system.

Process 1

This process for applying a chemical treatment employs conventional glass reinforcing fiber-forming equipment modified in the area around applicator 26 such that the position of the applicator 26 is adjustable in a plane perpendicular to the stream of the glass fibers 12 (i.e., the flow of fibers 10) as well as the plane containing the fibers 10. The applicator 26 is fixed to a wheeled cart by means of a cantilever arm. The cart is on rails so that it may be easily positioned along the axis perpendicular to the direction of flow of the fibers. The top of the cart is connected to the main body of the cart by a scissors jack and worm gear arrangement. This allows the applicator 26 to be raised or lowered relative to the bushing 24. The position of the applicator 26 can be adjusted along both axes while the process is running. The chemical treatment is stored in a metal pail, such as a 5-gallon bucket.

Heating of the chemical treatment is optional. To heat the chemical treatment, the bucket may be placed on a hot plate and/or wrapped with a bucket heater, such as a Model 5 available from OHMTEMP Corporation of Garden City, Mich. The temperature of the chemical treatment is maintained at the desired level by means of a variable AC thermocouple-based heating controller, such as those which are available from major scientific supply houses such as Fisher Scientific or VWR Scientific. The chemical treatment is pumped to and from the applicator pan 30 by means of a peristaltic pump, such as a Masterflex model #7529-8 equipped with a Masterflex pump controller model #7549-50 and Masterflex tubing part #6402-73, all available from Barnant Company (a division of Cole-Parmer in Barrington, Ill.). The applicator 26 is of a standard design for a glass fiber-forming process, and consists of a metal pan 30 supporting a single graphite roller 28 that is 3.0 inches in diameter and driven by an electric motor at speeds ranging from 3 to 20 feet per minute. An alternative pump can be used to replace the peristaltic pump, such as a Zenith pump model #60-20000-0939-4, available from Parker Hannifin Corporation, Zenith Pump Division, Sanford, N.C. This alternative pump is a gear-type pump equipped with a heated feed and return hose assembly, and generally has the following features: Teflon-lined, high-pressure, 0.222" inside diameter×72" long, 12,000 psi burst, 3000 psi operating pressure, stainless steel, $\frac{7}{16}$–20 thread JIC female swivel fittings, 120 volts, 300 watts, 100 ohm platinum RTD, 72" long cord with Amphenol #3106A-14S-06P plug, available from The Conrad Company, Inc., of Columbus, Ohio (the heated hose assembly is a difference between the two alternative (peristaltic vs. gear-type) pumping systems).

Process 2

In another exemplary process, a dual-roll applicator is used for applying high-viscosity, elevated-temperature chemical treatments in non-aqueous form. The dual-roll applicator is fixed in position relative to the glass-forming apparatus. The position of the dual-roll applicator is essentially the same as that found in a standard glass fiber-forming process, which is approximately 50 inches from the bushing. The heating system and pumping system used for the chemical treatment in this process are the same as described above for Process 1.

The dual-roll applicator includes a secondary applicator roll, which is the larger of the two rolls, for transferring and metering the chemical treatment to a smaller, primary applicator roll. The primary roll is used to directly apply the chemical treatment to the fibers. The relatively small diameter of the primary roll reduces the drag between the roll and the fibers by providing a reduced contact area therebetween. Tension in the fibers is also reduced due to the reduction in drag. The thickness of the applied chemical treatment may be metered by controlling the gap between the primary and secondary rolls and by providing a doctor blade on the smaller roll. Such a dual-roll applicator is disclosed in U.S. Pat. No. 3,817,728 to Petersen and U.S. Pat. No. 3,506,419 to Smith et al., the disclosures of which are herein incorporated by reference.

Process 3

In this preferred embodiment, a dual-roll applicator of Process 2 and the positional adjustment capability of Process 1 are used together, along with the above-described heating and pumping systems for the chemical treatment. The coated fibers 32 are gathered together into a strand 14 using a gathering mechanism 34, such as a conventional gathering shoe. A pulling mechanism 36, such as a conventional pair of opposing pull wheels, is used to continuously draw the fibers 12 from the bushing 24 in a manner well known in the art. The strand 14 can be wound on a package (not shown) or chopped into segments of desired length and stored for subsequent processing off-line into a composite article. Alternatively, the composite strand 14 can be processed directly into a composite article in-line with the gathering step.

In addition to the continuously formed reinforcing fibers 12, the fibers 10 can further comprise a plurality of matrix fibers 13 made from a suitable matrix material. If matrix fibers 13 are used, the step of applying the chemical treatment can include sizing and/or preimpregnating the matrix fibers 13 with the same or a different chemical treatment than that applied to the reinforcing fibers 12. If different types of matrix fibers 13 are used, it may also be preferable for a different chemical treatment to be applied to each type of matrix fiber 13. Likewise, if different types of reinforcing fibers 12 are used, it may be preferable for a different chemical treatment to be applied to each type of reinforcing fiber 12. The same techniques and equipment may be used to chemically treat each type of reinforcing fiber and matrix fiber, whether they are continuously formed or preformed.

Chemical Treatment Examples

Provided below are examples of chemical treatments for applying to glass reinforcing fibers and various matrix fibers, and suitable for use with PBT, nylon, and polypropylene matrix resins. The various matrix fibers are made from the same material as the corresponding matrix resin. The designations "HEAT" and "NO HEAT" indicate that the listed chemical treatments are heated to a significant degree or not, respectively, after being applied to their corresponding fibers. The chemical treatments below for reinforcement fibers with "NO HEAT" may also be used on matrix fibers made from the corresponding matrix resin. When continuously formed glass fibers reach the applicator at a conventional location (e.g., the applicator being a significant distance from the source of molten glass), the glass fibers are still giving off some residual heat. At this distance from the bushing, however, the amount of heat emanating from the fibers may not be enough to have any significant affect on some of the applied chemical treatments. The designation "NO HEAT" therefore covers such a situation.

EXAMPLE A

Composite matrix resin: PBT.
Formulation for reinforcement fibers:
(1) For HEAT: 83% HELOXY Modifier 67, 10% EPON SU-2.5, 5% maleic anhydride, and 2% A-1100;
(2) For NO HEAT: 95% HELOXY Modifier 67, 3% HELOXY Modifier 505, and 2% A-1100.
Formulation for matrix fibers:
(1) For HEAT: 83% HELOXY Modifier 67, 10% EPON 160, and 7% DICY;
(2) For NO-BEAT: 83% HELOXY Modifier 67, 10% HELOXY Modifier 62, and 7% TGIC.

EXAMPLE B

Composite matrix resin: nylon.
Formulation for reinforcement fibers:
(1) For HEAT: 44.5% PG-fumarate with hydroxy terminal groups, 44.5% TONE 0260, 5% DESMODUR N-100, 5% BES, and 1% A- 1100;
(2) For NO HEAT: (a) 47% propoxylated bis-A maleate, 47% TONE 0260, 5% BES, and 1% A-1100; or (b) 99% allylpropoxylate urethane and 1% A-1100.
Formulation for matrix fibers:
(1) For HEAT: (a) 90% allylpropoxylate urethane and 10% amic acid; or (b) 90% allylpropoxylate urethane, 5% PG-fumarate (hydroxy-terminated), and 5% DESMODUR N-100;
(2) For NO-HEAT: 47.5% propoxylated bis-A maleate, 47.5% TONE 0260, and 5% BES.

EXAMPLE C

Composite matrix resin: polypropylene.
Formulation for reinforcement fibers:
(1) For HEAT: (a) 68% PG-fumarate, 20% propoxylated allylalcohol, 5% maleic anhydride, 5% TBPB, and 2% A-1100 or A-174; or (b) 83% PG-fumarate (hydroxy-terminated), 5% DESMODUR N-100, 5% maleic anhydride, 5% TBPB, and 2% A-1100 or A-174;
(2) For NO-HEAT: (a) 88% allylpropoxylate urethane, 10% EPON 8121, and 2% A-1100; or (b) 90% allylpropoxylate urethane, 5% diallylphthalate, 2% maleic anhydride, 2% BPO, and 1% A-1100.
Formulation for matrix fibers:
(1) For HEAT: 91% allylpropoxylate urethane, 5% diallylphthalate, 2% maleic anhydride, and 2% TBPB;
(2) For NO-HEAT: (a) 90% allylpropoxylate urethane and 10% EPON 8121; or (b) 91% allylpropoxylate urethane, 5% diallylphthalate, 2% maleic anhydride, and 2% BPO.

The abbreviation DICY stands for dicyandiimide, which is a high-temperature amine-based curing agent for epoxy resins. Both the DICY curing agent and the reactive modifier diallylphthalate (for lowering viscosity) are available from the Aldrich Chemical Company. DESMODUR N-100 is a polyisocyanate available from Witco Chemical Company. The PG-fumarate, propoxylated bis-A maleate (propoxylated bisphenol-A maleate), allylpropoxylate-urethane, propoxylated ally alcohol, and amic acid (i.e., n-butyl amic acid) can all be prepared as described above. BES represents butoxyethylstearate, which may be replaced in the above chemical treatments, in whole or in part, by compounds such as the adduct of adipoylchloride and n-aminohexane or the adduct of 1,6-diaminohexane and hexanoylchloride, caprolactone (available from the Aldrich Chemical Co.), and amic acids, such as the n-butyl amic acid, and these alternative compounds may perform other functions in addition to that provided by the BES. TPBP and BPO are the peroxides t-butylperoxybenzoate and benzoyl peroxide, respectively, and are available from Akzo-Nobel Chemical Company of Chicago, Ill. EPON 8121 is a bisphenol-A type epoxy resin available from Shell Chemical Company.

The chemical treatment of 99% allylpropoxylate-urethane and 1% A1100 was applied to glass fibers, the coated fibers were formed into a composite strand, the composite strand was wire coated or encased with a sheath of nylon thermoplastic matrix material, the encased composite strand was chopped into pellets, and the pellets were injection molded into composite test specimens. The encased composite pellets were formed using the inventive wire-coating process described further below. The glass fibers in these composite test specimens were not completely dispersed in the matrix material. This lack of complete dispersion of the glass fibers from individual strands in the finished composite article indicates that at least a portion of the chemical treatment reacted enough, at some point during the manufacturing process, to prevent the fibers from separating and dispersing into the molten matrix material during the molding of the composite article (i.e., to maintain strand cohesion). To reduce its reactivity (i.e., to reduce fiber cohesion in each composite strand during the composite-article molding process) and thereby obtain more dispersion of the reinforcing fibers in the matrix material, the allylpropoxylate-urethane may be diluted with another film former—e.g., for a nylon system, TONE 0260 (a polycaprolactone, available from Union Carbide Corp.) may be used.

The following are further examples of thermoset-type and thermoplastic-type chemical treatments according to the present invention.

Nylon-Based Chemical Treatment

An especially preferred nylon-based thermoplastic-type chemical treatment was prepared by depositing about 9 kg of a polycaprolactone, specifically TONE 0260 (available from Union Carbide Corporation), and about 9 kg of a polyester alkyd, specifically propoxylated bisphenol-A-maleate, into separate 5-gallon metal cans. Upon the complete melting or liquefying of these two materials, they were combined in a heated five-gallon can and stirred until the mixture became homogeneous. The temperature was maintained at or above 200° F. (93° C.) with constant stirring until complete mixing was achieved (about 30 minutes). The heating was then discontinued and the mixture was allowed to cool to 190° F. (88° C.). While the temperature was maintained at 190° F. (88° C.), about 360 g of the amine silane coupling agent A-1100 (gamma-aminopropyltriethoxysilane) was added to the mixture with constant stirring. The resulting chemical treatment contained, by weight, 49–49.5% TONE 0260, 49–49.5% propoxylated bisphenol-A-maleate, and 1–2% A-1100. This chemical treatment was solid at about 25° C. and had a viscosity of 660 cps at 75° C., 260 cps at 100° C., 120 cps at 125° C., and 60 cps at 150° C.

The chemical treatment was then transferred with its container to a bucket heater described in Process 2 above, and pumped to a suitable applicator. Glass fibers 12 were attenuated and allowed to contact the applicator roll 28. The chemical treatment, at a temperature of about 115° C., was then transferred onto the glass fibers 12. The fibers 12 were gathered at a conventional shoe 34 and wound onto a collet, making a square-edged package, and allowed to cool.

The resulting package is stable and shippable, and the roving runs out well. The resulting composite strand 14 may be wire coated and chopped into pellets for eventual use in injection-molding applications.

PBT-Based Chemical Treatment

An especially preferred PBT-based thermoplastic-type chemical treatment was prepared by depositing 17.28 kg of diglycidyl ether of 1,4-butanediol (HELOXY 67) into a five-gallon metal can. To this was added 540 g of polyglycidyl ether of castor oil (HELOXY 505). To this mixture was added 180 g of A-1100 (gamma-aminopropyltriethoxysilane) as a coupling agent. The resulting chemical treatment contained, by weight, 96% HELOXY 67, 3% HELOXY 505, and 1% A-1100. This mixture was stirred until it became homogeneous. Then it was transferred with its container to a bucket heater, such as that of Process 1 (although it is not necessary to heat this chemical treatment to process it). For applying this chemical treatment, the applicator 26 is raised to within 8–10 inches (20.32–25.4 cm) from the bushing 24.

Polyester- or Vinylester-Based Chemical Treatment:

An especially preferred polyester- or vinylester-based thermoset-type chemical treatments is prepared by depositing 6.75 kg of DER 337 epoxy (a bisphenol-A epoxy resin, available from Dow Chemical Company) into a five-gallon metal can. This material is heated to 220° F. (104° C.) and stirred until all of the solids completely liquefy. To this liquid is added 6.75 kg of ARALDITE GT7013 epoxy (a bisphenol A epoxy resin, available from Ciba Geigy Corporation). The ARALDITE is added slowly with a great deal of agitation over a period of two hours. Upon complete dissolution of the ARALDITE epoxy, the mixture is allowed to cool in air to 200° F. (93° C.), and 0.76 kg of PLURONIC L101 (an ethylene oxide/propylene oxide copolymer surfactant, available from BASF) and 2.21 kg of PLURONIC P105 (an ethylene oxide/propylene oxide copolymer surfactant, also available from BASF) are added. Also added at this time is 1 kg of PEG 400 MO (polyethylene glycol monooleate, available from Henkel Corporation) and 0.5 kg of butoxyethylstearate (BES) (available from Stepan Company of Northfield, Ill.). The mixture is allowed to cool further with continued stirring to a temperature of 160–170° F. (71–77° C.), at which point 2 kg of A-174 (gamma-methacryloxypropyltrimethoxysilane, available from Witco Chemical Corporation) is added. Finally, 20 g of UVITEX OB (a fluorescent brightening agent available from Ciba-Geigy of Hawthorne, N.Y.) is added to the mixture with agitation to facilitate good dispersion. The resulting chemical treatment contains, by weight, 33.78% DER 337 epoxy, 33.78% Araldite GT7013 epoxy, 3.79% PLURONIC L101, 11.05% PLURONIC P105, 5% PEG 400 MO, 2.5% BES, 0.10% UVITEX OB, and 10% A-174. The chemical treatment is then transferred with its container to a bucket heater as described in Process 2.

Epoxy-Based Chemical Treatment:

The formulation for this example of a thermoset-type chemical treatment is as described above for polyester- and vinylester-based thermoset-type chemical treatments, except that A-187 (gamma-glycidoxypropyltrimethoxysilane, available from Witco Chemical Company) is used in place of A-174.

Two-Silane, Polyester- or Vinylester-Based Chemical Treatment:

The formulation for this example of a thermoset-type treatment, which has multi-compatibility (compatibility with polyester, vinylester or epoxy), is as described for the polyester- or vinylester-based thermoset-type chemical treatment described above, except that the silane coupling system consists of 1.25 kg (5% by weight) A-187 and 1.25 kg (5% by weight) A-174, in place of the A-174 alone.

In the preferred embodiment shown in FIG. 3, matrix fibers 13 are preformed and then commingled with the reinforcing fibers 12 before being gathered into a composite strand 14. Alternatively, the matrix fibers 13 may be continuously formed in-line with the reinforcing fibers 12. The matrix fibers 13 ultimately form part or all of the matrix of a resulting composite article. The fibers 10 may comprise both continuously formed and preformed reinforcing fibers 12 or only preformed reinforcing fibers. If preformed reinforcing fibers 12 are used, they can be processed directly into a strand 14 containing only the preformed reinforcing fibers 12. Such preformed reinforcing fibers 12 can also be commingled with any other types of fibers in the same, or a similar, manner as the preformed matrix fibers 13 shown in FIG. 3. While only two spools or packages of preformed fibers are shown, it is understood that any suitable number of packages of preformed fibers can be supplied in the illustrated manner or another suitable manner.

The same applicator 26 can be used to chemically treat both the preformed fibers (e.g., the preformed matrix fibers indicated by the phantom lines 13') and the continuously formed fibers (e.g., the continuously formed reinforcing fibers 12) before the fibers are gathered into a strand 14. Alternatively, a separate applicator 26' can be used to chemically treat the preformed fibers (e.g., the preformed matrix fibers 13). If a separate applicator 26' is used, the gathering mechanism 34 may include a bar or roller 39 to help commingle the fibers 12 and 13 together before being gathered into a strand 14. Preformed fibers and continuously formed fibers may be chemically treated either together using the same applicator or separately using different applicators, e.g., as described in U.S. patent application Ser. No. 08/527,601, now abandoned, filed Sep. 13, 1995, the disclosure of which is incorporated by reference. Alternatively, some of the fibers 10, e.g., matrix fibers 13, may be gathered together with the coated fibers 32 without a chemical treatment first being applied.

The applied chemical treatment may be heated before, during, and/or after the step of gathering the fibers. If it behaves as a thermoset, the applied chemical treatment can be partially or fully heat cured at some point during the formation of the composite strand 14. How much and when an applied thermosetting-type chemical treatment is heat-cured depend on the type of composite article being made from the strand 14. For example, a composite strand 14, with full, partial, or no heat-curing of the applied chemical treatment, can be chopped into a plurality of short discrete lengths, mixed into a molding compound, and injection molded into a composite article.

For chopped lengths of strand 14, an applied chemical treatment is cured enough, if at all, to ensure that the short lengths of the composite strand 14 remain cohesive (i.e., that fibers 10 stay together) during subsequent processing. Where it behaves as a thermoset or is otherwise heat-curable, the applied chemical treatment on the coated fibers is preferably only partially cured during the forming of the composite strand 14. Curing of the applied chemical treatment is preferably completed in subsequent in-line or off-line processing (e.g., pultrusion, filament winding, transfer injection molding, compression molding, etc.) of the composite strand 14 into a composite article. A thermosetting-type chemical treatment preferably remains only partially cured until the forming of the composite article, because if the molecular weight of the chemical treatment approaches infinity (i.e., is maximized) during the forming of the composite strand 14, then the strand 14 may not be further processable in downstream composite-forming applications.

Such partial curing may be accomplished by choosing ingredients which will not fully react with one another under the conditions present during the composite strand-forming process. It may also be accomplished by choosing the relative amounts of the reactive ingredients of the chemical treatment so that at least one of the thermosetting constituents in the chemical treatment (e.g., a resin) remains only partially reacted or cured until the forming of the composite article (e.g., by controlling the stoichiometry of the chemical treatment). An exemplary chemical treatment having at least one reactive constituent that can remain only partially reacted or cured during the strand-forming process comprises about 85% by weight PG-fumarate, about 10% by weight styrene, and about 5% by weight t-butylperoxy-benzoate.

In the chemical treatments listed in Examples A–C above, there are several reactive species represented. While in most cases it is preferable for some unreacted chemical species to remain on the strand 14 at the end of the strand-forming process, it may be preferable in some cases, for example, in the above-listed chemical treatments that contain isocyanates or amic acids, for the chemical species to be fully reacted when in the strand form. With the isocyanates, if there is a diol present and in sufficient quantity (e.g., about 20 times the number of isocyanate groups) and if the chemical treatment is applied at a high enough fiber surface temperature, the isocyanate groups will be fully reacted in the composite strand 14. Likewise, if the reaction conditions are right (e.g., high temperature and relatively low concentration), the amic acid in a chemical treatment will likely be completely converted to imide.

A chemical treatment can be prepared that comprises about 45% by weight PG-fumarate, about 50% by weight styrene, and about 5% by weight t-butylperoxy-benzoate. This represents a polyester resin formulation that may be applied to glass fibers using applicator equipment as described above in Processes 1–3 and that may cure to a hard mass on a glass fiber strand 14 upon the addition of heat emanating from newly formed glass fibers. By removing about 90% of the styrene, this polyester resin chemical treatment may be rendered only partially curable when applied to the fibers. An additional chemical treatment can be prepared that comprises about 35% by weight of the epoxy resin EPON 828, available from Shell Chemical Company, about 35% by weight of the reactive epoxy modifier HELOXY 505, about 28% by weight maleic anhydride, and about 2% by weight A1100. This epoxy resin formulation may be applied to glass fibers using any of the applicator equipment described above, and cures to a hard mass on a glass fiber strand 14 upon the addition of heat emanating from newly formed glass fibers. By removing about 90% to all of the maleic anhydride, this epoxy-resin chemical treatment may be rendered only partially curable when applied to the fibers.

By raising the applicator 26 to a position closer to the heat emanating from the molten glass (e.g., bushing 24), the viscosity of a thermoplastic-type chemical treatment on the surface of the applicator roll 28 (i.e., where the roll 28 comes in contact with the glass fibers 10) has been observed to drop, as well as that on the surface of the glass fibers 12. A thermosetting-type chemical treatment which behaves like a thermoplastic at this stage of the process will also experience such a lowering of its viscosity. Gradients in the viscosity of the chemical treatment have been observed along the surface of the applicator roll 28. The viscosity has been found to be the lowest behind the fan of glass fibers 10, and appears to increase toward either end of the roller 28.

For the FIG. 1 embodiment of apparatus 20, the applicator 26 is positioned adjacent or otherwise close enough to the bushing 24 that the chemical treatment is applied when the fibers 12 are at a high enough temperature (i.e., the fibers 12 emanate enough heat energy) to cause the desired drop in the viscosity and/or the desired degree of heat curing by crosslinking or otherwise increasing the molecular weight of the applied chemical treatment. At the same time, the applicator 26 is preferably positioned far enough away from the bushing 24 so that the chemical treatment is applied while the fibers 12 are at a temperature which will not cause significant damage to the chemical treatment (e.g., decomposition of any organic chemicals or compounds). In this way, the resulting strand 14 can be provided with the properties desired for subsequent processing into a composite article.

Exemplary fiber temperatures for applying the chemical treatments are temperatures of up to about 350° C. (662° F.), with it possible to apply some treatments at even higher temperatures, without being significantly degraded or otherwise damaged. Fiber temperatures as low as about 150° C. (302° F.), or even lower, may be used. To protect the applied chemical treatment and cause at least one of the above two desired changes to occur in the applied chemical treatment, preferably the fibers 12 are at a temperature of from about 200° C. (392° F.) to about 300° C. (572° F.). Satisfactory results have been obtained when the viscosity of the chemical treatment of either type drops down to from about 200 cps to about 400 cps at a temperature of from about 200° C. to about 300° C.

For glass reinforcing fibers 12 drawn from a conventional bushing 24 having a normal throughput, the applicator 28 is preferably disposed so that the chemical treatment is applied to the glass fibers 12 at a minimum of at least about 3 inches (7.62 cm), and typically about 6 inches (15.24 cm), or more from the bushing 24 (i.e., from where the fibers 12 exit the bushing). The chemical treatment may be applied to the glass reinforcing fibers 12 at a distance of from about 8 inches to about 10 inches (20.32 cm to 25.4 cm) from the bushing 24. The exact location of the applicator 26 relative to the bushing 24 depends, for example, on the type of bushing 24 used (e.g., the number of fibers being drawn from the bushing), the temperature of the molten glass material, the type of chemical treatment being applied, the desired properties of the interphase region around the reinforcing fibers 12, and the properties desired for the resulting strand 14 and ultimately for the composite article.

Referring to the alternate embodiment depicted in FIG. 2, an apparatus 38 includes the components of the previously described apparatus 20 and a heat retainer 40. Accordingly, components of apparatus 38 the same or similar to those of apparatus 20 have been designated with the same reference numerals. The heat retainer 40 is disposed, partially or completely, at least around the fibers 12 and is adapted using conventional techniques to maintain the heat energy emanating from the surface of the fibers 12 for a longer period of time and a farther distance from the fiber-forming mechanism 22. Satisfactory results have been obtained with a low-throughput glass fiber bushing 24 using an exemplary heat retainer 40 made from sheet metal formed into an open-ended rectangular box shape having a length of about 15 inches (38.1 cm), a width of about 3 inches (7.62 cm), and a height of about 16 inches (40.64 cm). A low-throughput glass fiber bushing 24 typically forms glass reinforcing fibers 12 at a rate of less than or equal to about 30–40 lbs./hr (13.62–18.16 kg/hr). The box-shaped heat retainer 40 is disposed between the fiber-forming mechanism 22 and the applicator 26 so that at least the fibers 12 are drawn through its open ends 42 and 44. Preferably the heat retainer 40 is sufficiently insulative to keep the surface of each fiber 12 at a temperature of from about 150° C. (302° F.) to about 350° C. (662° F.) by the time the applicator 26 applies the chemical treatment to the fibers 12.

The use of such a heat retainer 40 is particularly advantageous when a low-throughput continuous glass fiber forming bushing 24 is being used. The amount of heat energy being stored by the fibers 12 formed using a low-throughput bushing 24 is less than that stored by fibers 12 formed using a normal- or high-throughput bushing. Thus, the heat retainer 40 allows fibers 12 formed using a low-throughput bushing to be maintained at the temperature needed to cause the desired reaction (drop in viscosity and/or at least partial heat curing) in the applied chemical treatment. The heat retainer 40 may be modified to be disposed up to or even farther downline beyond the applicator 26 in order to maintain the fibers 12 at a desired elevated surface temperature at a point up to or downline from the applicator 26. For example, another heat retainer similar in structure to heat retainer 40 could be disposed, partially or completely, around the coated fibers 32 and between the applicator 26 and the gathering mechanism 34. The use of such an additional heat retainer may be desirable when additional curing of the chemical treatment is needed before the strand 14 is collected, for example on a spool, or otherwise subsequently processed. An example of a means that may be useful as such a heat retainer in the present invention, in particular, after the chemical treatment is applied to the fibers, is described in U.S. Pat. No. 5,055,119, the disclosure of which is incorporated by reference herein.

The energy used in heating the applied chemical treatment can be at least partially, if not completely, provided by heat energy emanating from the coated fibers 32. For example, residual heat emanating from, or remaining in, the continuously formed glass fibers can provide a substantial amount of the heat energy. Residual heat emanating from continuously formed polymeric matrix fibers 13 may similarly be used to effect desired changes in an applied chemical treatment.

If residual heat from the fiber-forming process is not available or is insufficient, such as when the fibers 10 are preformed, have cooled off, or otherwise are not at the desired temperature, the fibers 10 can be pre-heated to impart the heat energy desired for the applied the chemical treatment. Such pre-heating can be accomplished by the use of a conventional heating system. For example, referring to FIG. 2, a conventional open-ended furnace (not shown) can be used in place of the heat retainer 40 to pre-heat at least the fibers 12 to the desired temperature before the chemical treatment is applied.

By using heat energy emanating from the fibers 32 to supply at least part of the necessary heat energy, the applied chemical treatment has its viscosity reduced and/or is at least partially heat-cured from the surface of the coated fibers 32 outwardly through at least part of the applied chemical treatment. Heating from the fiber surface outwardly is especially preferred and efficient way to heat the applied chemical treatment and to help optimize bonding between the chemical treatment and the surface of the coated fibers 32. In addition, heating from the surface of the coated fibers 32 outwardly allows for greater versatility in engineering the interphase region formed by the applied chemical treatment, between each of the coated fibers 32 and the matrix material of the composite article.

For example, heating an applied thermoplastic-type chemical treatment from the inside out helps to insure that its viscosity at the surface of the fibers will be low enough to obtain adequate wetting of the fiber surface. In addition, heating an applied heat-curable chemical treatment in this manner allows for the applied chemical treatment to be fully cured only at its interface with the fiber surface, thereby retaining an outer region of only partially cured or uncured chemical treatment, which can be fully cured when and where it is desired during subsequent processing. For instance, it may be desirable for this outer region to be partially cured or uncured to facilitate bonding between the chemical treatment and a subsequently applied matrix material or between the contacting layers of the applied chemical treatment on adjoining fibers.

Preferably, heat emanating from the fibers 12 is used to heat the applied chemical treatment. Optionally, the energy used to heat the applied chemical treatment may be partially, substantially, or completely provided by heat energy emanating from a source external to the coated fibers. For example, after the chemical treatment is applied, the coated fibers 32 can be passed through a conventional open-ended furnace (not shown) either before, during, or after the coated fibers 32 are gathered into the strand 14. The applied treatment can also be heated externally during the forming of the strand 14 into a composite article. By heating it externally, the applied treatment has its viscosity reduced and/or is at least partially heat cured from its outer surface into the applied chemical treatment toward the surface of the coated fibers 32. Thus, it is also contemplated that the energy used to heat the applied chemical treatment may be provided by a combination of heat emanating from the coated fibers 32 and one or more external heat sources disposed so as to heat at least the reinforcing fibers 12 before and/or after the chemical treatment is applied.

The chemical treatment may be kept cool before it is applied to the fibers 12 to permit the use of very reactive ingredients and to help reduce the risk of heat-caused degradation of the chemical treatment. The temperature of the chemical treatment before being applied may be kept at less than or equal to about room temperature for the same reasons. The chemical treatment can be kept at the desired temperature by any suitable means. For example, a cooling coil (not shown) can be submerged within the chemical treatment. When continuously formed glass fibers are being formed, the apparatus may also be adapted so as to surround the glass fibers 12 with an inert atmosphere before the chemical treatment is applied. The inert atmosphere should help prevent moisture from accumulating on the surface of the fibers 12, thereby inhibiting moisture-induced cracking and moisture-caused passivation of potential reactive species on the glass fiber surface. An inert atmosphere may not be desired when a high-output bushing is used or any other time the temperature of the glass fibers is sufficiently high. The glass fibers 12 can be surrounded with an inert atmosphere by using the heat retainer 40 (see FIG. 2) or similar structure to surround the glass fibers, with piping of the inert atmosphere into the heat retainer 40 as the fibers 12 pass therethrough. Suitable inert atmospheres include, for example, one or a combination of nitrogen and argon gases.

An advantage of the inventive chemical treatments is that they may be processed using known fiber, strand, and composite-article forming equipment. In a preferred embodiment, the solvent-free chemical treatments are advantageously employed in a wire-coating system described below.

Preparation of Encased Strands

Another general aspect of the invention relates to a method and apparatus for making one or more plastic-encased composite strands that are moldable into a composite article having a polymeric or resinous matrix reinforced with fibers made from a suitable reinforcing material, such as a glass material, a synthetic or polymeric material, or another suitable non-glass material. The encased composite strands may be in thread form (i.e., long lengths) or pellet form (i.e., short lengths).

More particularly, each encased composite strand has a plurality of fibers, including at least reinforcing fibers and optionally fibers made of the thermoplastic matrix material to be used in the composite article. The fibers are processed into a strand or bundle, with each strand preferably containing from about 1,500 to about 10,000 fibers, more preferably from about 2000 to about 4,000 fibers. The strand is preimpregnated with a chemical treatment before the strand is formed.

The preimpregnated composite strand is encased in a sheath of thermoplastic material. When the encased composite strand is to be formed into pellets, the chemical treatment is applied in a sufficient amount and between enough of the fibers to keep the fibers from falling out of the pellet. When the encased composite strand is to be formed into thread, the chemical treatment is disposed between substantially all of the fibers.

In a preferred embodiment, the chemical treatment is a thermoplastic-type polymeric material. Alternatively, the chemical treatment impregnating the composite strand may be a thermoset-type polymeric material that is in a fully cured, partially cured, or uncured state. The strand of fibers optionally may be fully impregnated with an engineering thermoplastic matrix material, such as that used to encase or coat the composite strand. Although some engineering thermoplastic materials have relatively high melting points and high viscosities that can make it very difficult or impractical to apply the engineering thermoplastic to the fibers using conventional applicators, the artisan may appropriately modify such engineering thermoplastics for use as a chemical treatment in the invention.

Preferably, the sheath encasing the composite strand is made from the same thermoplastic material as that used to form the matrix of the composite article. The thermoplastic sheath material may form a portion or all of the matrix of the composite article, depending on the thickness of the sheath. Preferably the chemical treatment sufficiently bonds or otherwise helps the sheath keep the fibers together in the preimpregnated strand, at least until the molding of the composite article. In addition, the chemical treatment is at least compatible with the thermoplastic matrix material of the composite article.

According to a preferred process for making one or more of the thermoplastic-encased composite strands, a wire-coating or extrusion-coating process is used. The process comprises the steps of: providing a plurality of fibers comprising at least reinforcing fibers; applying a chemical treatment so as to coat substantially all of the fibers and thereby form preimpregnated fibers; gathering or otherwise combining the coated fibers together into at least one preimpregnated strand having the chemical treatment disposed between substantially all of the fibers forming the preimpregnated strand; coating at least the outside of the preimpregnated strand with a thermoplastic material to form at least one coated strand; and forming the coated strand into at least one wire-coated or otherwise encased composite strand.

The fibers can be provided using an in-line process that includes continuously forming the reinforcing fibers from a source of molten reinforcing material, such as glass. In addition to continuously formed reinforcing fibers, the fibers being provided may include preformed reinforcing fibers, preformed matrix fibers, continuously formed matrix fibers, or combinations thereof. When it is an aqueous system, the applied chemical treatment on the fibers is heated to evaporate a substantial amount of the moisture therein before the coated fibers are gathered together into a preimpregnated strand. When it is a thermoset-type, the chemical treatment is applied to the fibers either in an uncured or partially cured state. The uncured or partially cured chemical treatment that ends up impregnating the encased composite strand may be processed (e.g., by heating) to induce additional partial or full curing, depending on the desired condition of the encased composite strand during the molding of the composite article. In a preferred embodiment, a solvent-free chemical treatment as described above is used. Alternatively, a two-part non-aqueous chemical treatment may be used as set out in U.S. patent application Ser. No. 08/487,948, filed Jun. 7, 1995, now abandoned, the disclosure of which is hereby incorporated by reference.

Figure 5:
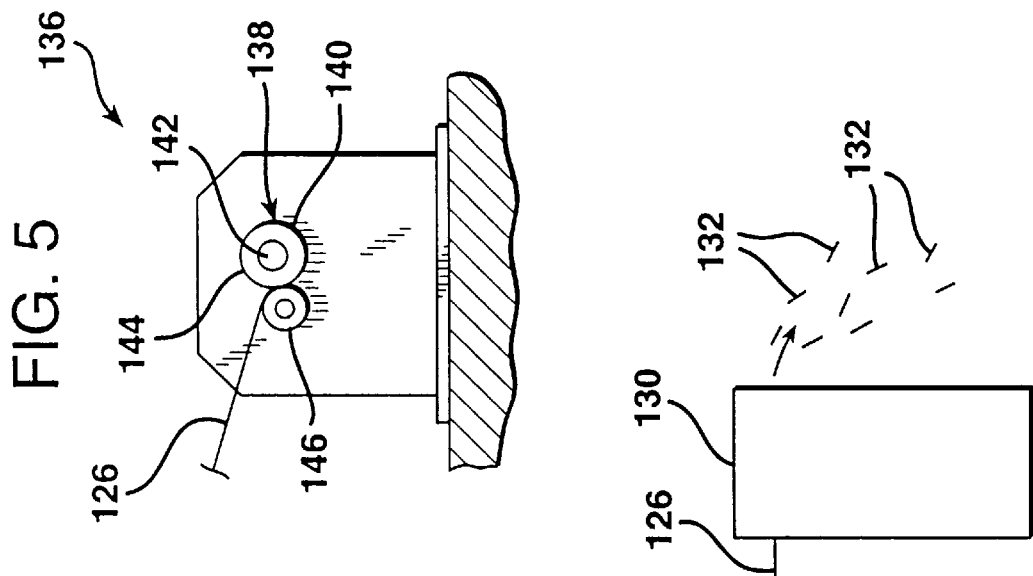
FIG. 5 is a plan view of a winder device for winding a thermoplastic-encased composite strand into a package of thread suitable for being molded into a fiber-reinforced thermoplastic composite article.
Figure 4:
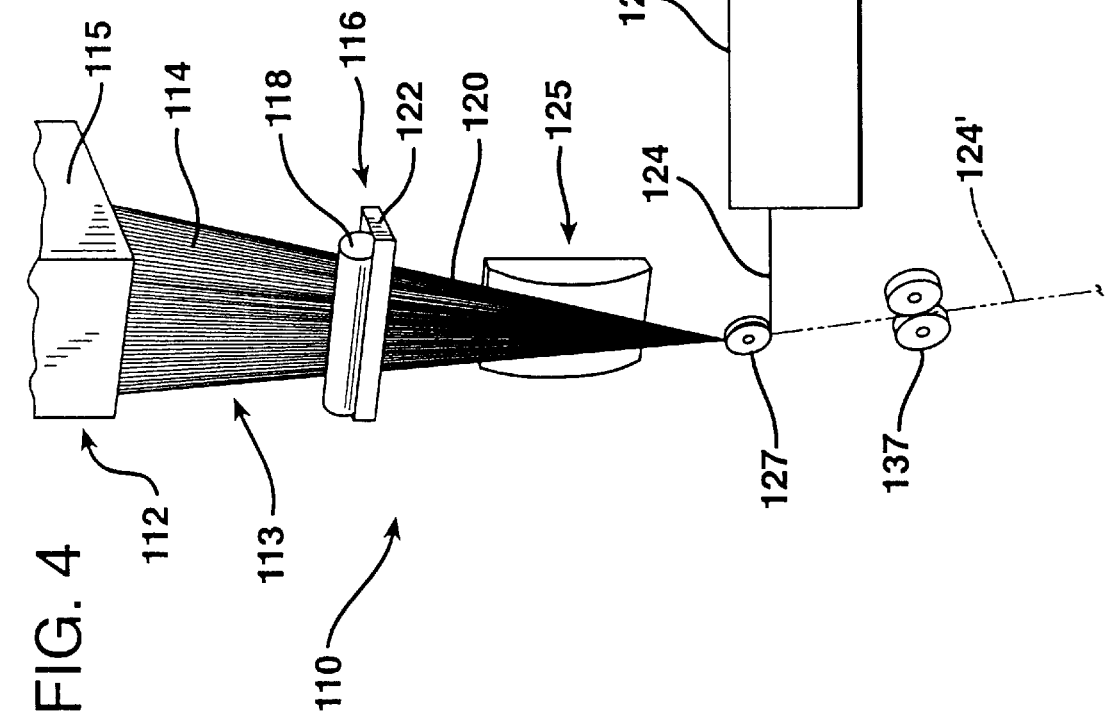
FIG. 4 is a perspective view of one embodiment of an apparatus for making and then chopping a thermoplastic-encased composite strand of preimpregnated reinforcing fibers into a plurality of pellets suitable for being molded into a fiber-reinforced thermoplastic composite article.
Figure 6:
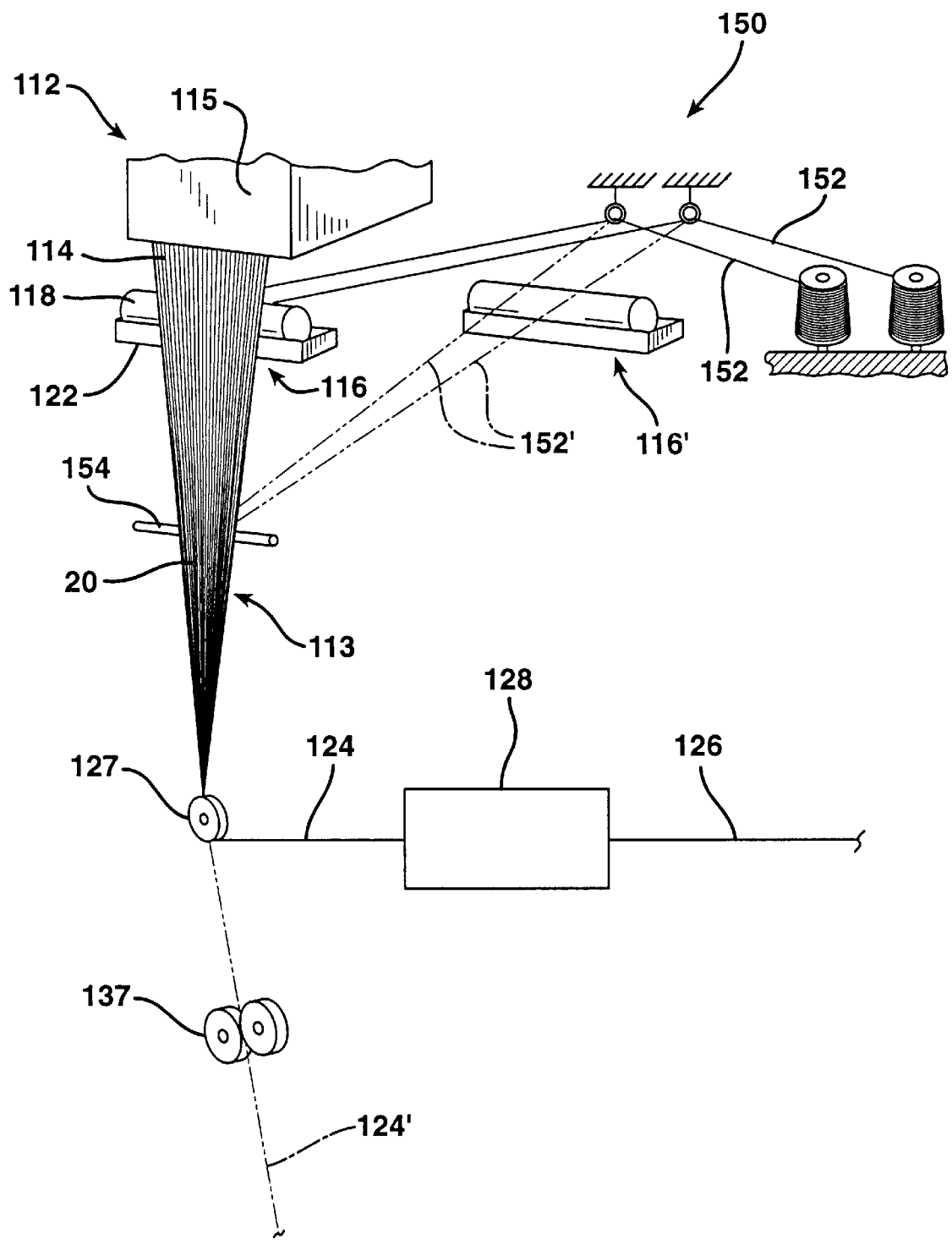
FIG. 6 is a perspective view of another embodiment of an apparatus for making and then chopping a thermoplastic-encased composite strand of preimpregnated fibers into a plurality of pellets suitable for being molded into a fiber-reinforced thermoplastic composite article.

Exemplary systems for forming polymer-encased strands are illustrated in the drawings, particularly in FIGS. 4–6. FIG. 4 shows one embodiment of an apparatus 110, including a source 112 of fibers 113, which in this embodiment consist of reinforcing fibers 114. One exemplary source 112 is a conventional bushing 115 of molten reinforcing material (e.g., glass) from which the continuous reinforcing fibers 114 are drawn.

An applicator 116 applies a chemical treatment onto substantially all of the fibers 114. In an exemplary embodiment, the chemical treatment being applied is aqueous, and the applicator 116 is a conventional type suitable for applying aqueous-based chemical treatments. The exemplary applicator 116 includes a rear-facing applicator roller 118, which applies the chemical treatment to the reinforcing fibers 114, thereby forming preimpregnated or coated fibers 120. The chemical treatment is applied as the fibers 114 come in contact with the roller 118 when passing thereover. A trough 122 containing the chemical treatment is positioned below the roller 118. The roller 118 extends into the trough 122, and transfers the chemical treatment from the trough 122 to the fibers 114 as the roller 118 is rotated by a conventional drive device, such as a motor (not shown). Other suitable devices or techniques used for applying size or other chemical treatments may be used in place of the applicator roll assembly 116 to apply the chemical treatment to the reinforcing fibers 114.

The aqueous-based chemical treatment applied on the preimpregnated or coated fibers 120 is heated to evaporate a substantial amount of the moisture therein, and then the coated fibers 120 are gathered together into a preimpregnated composite strand 124. The moisture can be driven out of the applied aqueous-based chemical treatment using any suitable heating device 125. For example, the coated fibers 120 can be passed over and brought into contact with a heating device 125 substantially similar to either of the heating plates described in U.S. patent applications Ser. Nos. 08/291,801, filed Aug. 17, 1994, now abandoned, and 08/311,817, filed Sep. 26, 1994, now U.S. Pat. No. 5,626, 643, the disclosures of which are incorporated by reference herein.

A conventional gathering shoe or some other form of gatherer 127 can be used to gather together the dried fibers 120 into at least one preimpregnated strand 124. The preimpregnated strand 124 is coated or encased with a layer of polymer material and thereby formed into an encased composite strand 126 by pulling or otherwise passing the preimpregnated strand 124 through a wire coater 128. A wire coater is a device or devices capable of, or means for, coating one or more preimpregnated fiber strands with a polymer material so as to form a polymeric sheath on each preimpregnated strand 124. Preferably, each strand contains from about 1,500 to about 10,000 fibers, more preferably, from about 2,000 to about 4,000 fibers.

The fibers 113 used in forming an encased composite strand 126 can be made using an in-line process, like the one shown in FIG. 4, where reinforcing fibers 114 are continuously drawn from a bushing 115 of molten reinforcing material, such as glass. In addition to or instead of continuously formed reinforcing fibers 114, the fibers 113 may comprise preformed reinforcing fibers. Also, the fibers 113 may include preformed matrix fibers, and even continuously formed matrix fibers, or combinations thereof. An exemplary system for applying an aqueous chemical treatment to continuous and preformed fibers to form a preimpregnated strand is disclosed in the above-incorporated U.S. patent application Ser. No. 08/311,817, now U.S. Pat. No. 5,626, 643.

The matrix fibers ultimately form part or all of the matrix of the resulting composite article or product, such as pellets 132. Examples of suitable polymeric materials for the matrix fibers include polyesters, polyamides, polypropylenes, and polyphenylene sulfides. The continuous and preformed reinforcing fibers may be glass fibers, synthetic fibers, and/or any other suitable reinforcing fibers, e.g., fibers of traditional silicate glass, rock wool, slag wool, carbon, etc. When various fibers made from different materials are used, the same or a different chemical treatment may be used for each type of fiber.

Preferably, the wire coater 128 includes a source of molten polymeric material, such as a conventional extruder, for providing the material used to encase the preimpregnated strand 124. The wire coater 128 also preferably includes a die or other suitable means having at least one outlet or exit opening for shaping the sheath into a desired thickness and/or cross-section, preferably into a thickness and cross-section that are maintained relatively uniformly along its length. An exemplary wire coater 128 is manufactured by Killion of Cedar Grove, N.J., which includes a KN200 2-inch extruder equipped with a cross-head coating die. One or more encased composite strands 126 can be formed by pulling or otherwise passing one or more of the coated strands 124 through one or more such dies. The sheath material is preferably thermoplastic and may form a portion or all of the matrix of the composite article, e.g., depending on the thickness of the sheath. In a preferred embodiment, the sheath encasing the composite strand 124 is made from the same thermoplastic material as that used to form the matrix of the composite article.

When it is desired for the encased composite strand 126 to be in short lengths, the apparatus 110 can include means such as a chopper 130 for cutting or otherwise separating the encased composite strand 126 into a plurality of encased composite pellets 132. An exemplary chopper 130 is the model 204T Chopper manufactured by Conair-Jettro of Bay City, Mich. When pellets 132 are being formed, the chemical treatment helps keep together the fibers 114 in each encased composite pellet 132 (helps keep a significant number of the fibers 114 from falling out of a pellet 132).

The encased composite pellets preferably have lengths of from about 3/16 inch (0.476 cm) to about 1½ inches (3.8 cm), although they can be longer or shorter as appropriate. In ah exemplary embodiment, the pellets have lengths of approximately 0.5 inches (1.27 cm). Of course, the length of a pellet may vary from one application to another. Moreover, the form of the encased composite strand may vary to suit the particular application.

The fibers 114 may be pulled through the apparatus 110 using a puller 134, which functions, e.g., to draw the reinforcing fibers 114 from the bushing 115 and pull the preimpregnated strand 124 through the wire coater 128. An exemplary puller 134 which has been used successfully in-line with the above-described Killion wire coater 128 is a 4/24 High Speed Puller, also manufactured by Killion. Alternatively, the wire coater 128 and/or the chopper 130 may be adapted to perform the function of the puller or to aid the puller in pulling the preimpregnated strand 124 through the wire coater 128.

When it is desired for the encased composite strand product to be in thread form, the chopper 130 may be replaced by a winder device 136 for drawing the reinforcing fibers 114 from the bushing 115, pulling the preimpregnated strand 124 through the wire coater 128, and winding the encased composite strand 126 into a spool or other package 138 of encased composite thread 140. When in thread form, the strand 124 is at least substantially, if not fully, impregnated with the applied chemical treatment. That is, the strand 24 is impregnated enough to produce satisfactory properties in the composite article formed thereby.

Optionally, the winder device 136 may include a puller to help draw the fibers 114 and/or pull the strand 124. The exemplary winder device 136 illustrated in FIG. 5 comprises a rotatable member or a collet 142, upon which is provided a removable large-diameter spool 144. The winder device 136 also includes a traversing mechanism 146 to distribute the continuous composite strand 126 along the length of the spool 144 to form a package 138. An air supply device (not shown) may be provided for supplying streams of air which impinge upon the strand 126 to cool it before winding.

Exemplary winding means 136 which may be used in conjunction with an off-line wire coating operation combines a Hall Capstan Machine #634 (a puller) and a Hall Winder Machine #633, both of which are manufactured by Hall Industries of Branford, Conn. In such an off-line wire coating operation, the preimpregnated strand 124 is first formed and packaged, then the packaged strand 124 is subsequently unwound off-line and pulled through the wire coater 128, and the resulting encased composite strand 126 is rewound into a package. If appropriate, the above-mentioned Hall wire-winding device can be adapted using techniques known in the wire- and cable-handling industry to handle the high processing speeds associated with an in-line wire coating process. For example, the spool 144 on which the encased composite thread 140 is wound can be made with a larger diameter.

An exemplary setup procedure for the apparatus 110, and generally for a wire coater 128, includes threading or otherwise passing the free end of the preimpregnated strand 124 through the wire coater 128 and pulling enough of the strand 124 therethrough to allow the process to proceed on its own (e.g., to allow the strand to be pulled automatically). Such a setup procedure may include temporarily pulling a free end of the preimpregnated strand 124 (indicated by phantom line 124'), such as with a pair of conventional pull wheels 137 positioned apart from the wire coater 128, until a sufficient length of the preimpregnated strand 124 is available for passing through the wire coater 128. This length of the preimpregnated strand 124 is then passed through the wire coater 128 and pulled therethrough by the puller 134, chopper 130, winder 136, or a combination thereof. With the above-described wire coater 128 a feeder line is preferably used to thread the free end of the preimpregnated strand 124 through the wire coating die. Such a feeder line has an end capable of being secured to the free end of the strand 124. For example, a length of wire with a hook at one end can be used as the feeder line. The feeder line can be pre-positioned through the wire-coater die and the free end of the strand 124 doubled over, hooked by the feeder line, and then drawn through the wire coater 128. It is preferable to implement such a setup procedure during the beginning of the process and in the event of a break-out (i.e., a strand of fibers breaking).

Preferably, the die used in the wire coater 128 has an openable or "clam-shell" configuration that allows the preimpregnated strand 124 to be laid into the die from one end to the other, rather than requiring threading longitudinally through the die. Such an openable die can eliminate the need for the above-described feeder line. An exemplary clam-shell die comprises two die halves which can be mated using guide posts or pins disposed through matching holes formed through opposing faces of the die halves. Alternatively, the two die halves can be hinged along adjoining edges and adapted to be fastened together along the opposite edges when the halves are hinged closed. The face of each die half defines half of the die cavity through which the preimpregnated strand is pulled. With the die halves mated together, the die cavity has and entrance opening and an exit opening. It is preferable for the entrance to be oversized to minimize fiber abrasion and for the exit to be sized so as to define the desired final diameter, and sheath thickness, of the encased composite strand 126.

With the die halves separated, the strand 124 can be quickly disposed between the die halves and the strand 124 trapped therebetween in the die cavity by closing the die halves. A high-temperature gasket may be disposed between the opposing faces of the two die halves along the length of the die cavity. Each die half has one or more gates (i.e., through-holes) through which one or more streams of the molten thermoplastic encasing material, for example, from the extruder, are delivered into the die cavity so as to encase the preimpregnated strand 124 as it is pulled therethrough. Each die half can be adapted to accept a variety of inserts tailored with different die cavities to vary the cross-sectional profile (e.g., round, rectangular, oval, irregular, etc.) of the encased strand 126. With such replaceable inserts, the same die can handle a variety of fiber diameters with less downtime caused by having to replace the entire die.

Preferably, the chemical treatment is selected to bond or otherwise help the sheath keep the fibers 113 together in the encased composite strand 126, at least until the molding of the composite article. To help ensure that the composite article exhibits optimal mechanical properties between its reinforcing fibers and its matrix, the chemical treatment should be compatible with the thermoplastic matrix material of the composite article. A chemical treatment is considered compatible with the matrix material if it does not cause important properties, such as tensile strength, tensile modulus, flexural strength, or flexural modulus, of the resulting composite article to be inadequate. Such compatibility may be accomplished by formulating the chemical treatment so as to be capable of interacting with and/or reacting with the thermoplastic matrix material. The interaction and/or reaction between the chemical treatment (e.g., thermoplastic- or thermoset-type) and the matrix material may occur during the making of the encased composite strand, during the molding of the composite article, or during both processes.

The chemical treatments may be miscible in the matrix material, in whole or in part, and/or may form a separate phase from the matrix material. Where a separate phase is formed, the chemical treatment disposed around each fiber may form a plurality of separate phase regions dispersed in the matrix material and/or a single separate phase region surrounding its corresponding fiber. A chemical treatment, such as one of those discussed below, may be selected to enhance the properties of the composite article.

Aqueous Chemical Treatments

The aqueous chemical treatment applied, e.g., using the apparatus 110, may comprise one or more polymeric film formers in the form of a solid powder or other particles dispersed in a water medium. The particulate film former may be a thermoplastic-type polymer, a thermoset-type polymer, or a combination of both. Low and/or high molecular weight solid thermoplastic and thermoset polymers may be used to form a particulate film former. The aqueous chemical treatment may also include one or more binders dispersed in the water medium along with the particles of the film former. The binder may include a thermoplastic and/or thermoset liquid, low melting point thermoplastic particles, or a combination thereof.

Preferably, the binder prevents the solid particles of the film former from falling out of the encased composite strand, as well as prevents the fibers from falling out of the composite strand, even when the strand is in the form of a pellet. To accomplish this, the thermoplastic binder particles are at least partially molten or fusible by the heat energy used to evaporate the water out of the chemical treatment. In addition, the liquid binder has the necessary degree of tackiness or adhesiveness to sufficiently maintain the cohesiveness of the film former particles and the fibers. Preferably, a higher melting point thermoplastic film former powder is modified or combined with a lower melting point thermoplastic binder powder, such as particles of polyvinyl acetate (PVAc), aqueous urethane, etc.

The aqueous chemical treatment may also contain a liquid film former dispersed in the water medium (e.g., as an emulsion). The liquid film former may comprise one or more low molecular weight thermoplastic polymers, one or more thermoset polymers, or a combination thereof. Preferably, with an aqueous chemical treatment emulsion, a liquid film former also functions as the binder. The aqueous chemical treatment may also be a combination of a liquid-solid dispersion and a liquid-liquid emulsion.

The thermoset-type film formers and binders used in the aqueous chemical treatments are preferably applied to the fibers in an uncured state, although they may also be applied in a partially cured state. The amount of set or cure of a thermoset-type chemical treatment may be controlled by choosing a thermosetting material, with an appropriate curing temperature, that will cure to the degree desired at the temperatures seen during processing according to the present invention. The uncured or partially cured thermoset-type chemical treatment impregnating the encased composite strand may be processed (e.g., by heating) to induce additional curing or full curing, depending on the desired condition of the encased composite strand during the chopping operation, the winding operation, or the molding of the composite article. The degree to which an applied thermoset-type chemical treatment is cured, regardless of whether it is aqueous or not, may be controlled by using a heating device (e.g., heater 125).

Therefore, the thermoset-type chemical treatment may be tailored to allow only enough curing, if any, to maintain the cohesiveness and/or degree of impregnation of the encased composite strand until the molding of the composite article. The individual fibers forming the strand do not have to separate in the thermoplastic matrix material to form a desired composite article. The thermoset-type chemical treatment may then be adapted to fully cure so that the fibers essentially remain permanently together, even during the molding of the composite article.

The aqueous solution treatment contains an amount of one or more chemical treatment polymers or other organic compounds or materials (e.g., film formers, binders) to sufficiently preimpregnate the fibers. For example, the aqueous chemical treatment contains enough of the film former and, if present, binder polymers to impregnate the fibers to the degree desired. It is preferable for the aqueous chemical treatment to contain one or more film formers, binder polymers, and/or other organic material in sufficient concentrations to provide the preimpregnated strand with an organic material content of up to about 25% by weight, more preferably of up to about 15% by weight, and even more preferably of approximately 6–7% by weight, based on the total weight of the chemical treatment plus fibers, after the desired amount of moisture has been removed from the applied chemical treatment. This degree of organic material loading may also be useful for non-aqueous chemical treatments discussed herein. A loss on ignition (LOI) method can be used to determine the amount of applied chemical treatment loaded onto the fibers. Satisfactory results have been obtained with a chemical treatment solution having an organic material content of about 30% by weight. Such an organic material concentration attains strands preimpregnated with 5–15% by weight of the organic compounds present in the chemical treatment.

A suitable organic material concentration of the aqueous chemical treatment can generally be selected independently of the form of the chemical treatment (i.e., dispersion, emulsion, or the like). In addition, the concentration of organic materials in the preimpregnated strand, for a given concentration, can vary depending on a number of factors, such as how fast the fibers are moving, the temperature of the heating device, the temperature of the chemical treatment when applied, the tendency of the chemical treatment to remain impregnated in the strand (e.g., its viscosity), the speed (rpm's) of the applicator roller, and whether prepad water sprays are used.

The following are specific examples of aqueous chemical treatments which may be applied, e.g., using the apparatus 110, to preimpregnate fibers.

EXAMPLE I

Six thousand grams (6000 g) of chemical treatment was formed by the following procedure. Fifteen g (0.25% weight percent as received) of amine silane coupling agent A-1100 was added to 2345 g of deionized water. This was stirred for several minutes. Then 1875 g (31.25%) of film former COVINAX 201 and 1500 g (25.0%) of film former COVINAX 225 were combined in a two-gallon pail. The silane solution was then mixed with the mixture of film formers using moderate agitation. Next, 480 g (8.0%) of MALDENE 286 was added to the mixture of silane and film formers. Finally, 200 g (3.3%) of BES homogenate ( the fatty acid ester KESSCO BES that has been emulsified into a homogenate) was added under continuous stirring. The organic compound concentration of the resulting chemical treatment solution was 30% by weight. The resulting chemical treatment is appropriate for applying to polyamide fibers as well as glass fibers.

EXAMPLE II

Six thousand grams (6000 g) of chemical treatment was formed as follows. Fifteen g (0.25%) of A-1100 silane was added to 1870 g of deionized water. This was stirred for several minutes. Then 3450 g (57.5%) of film former SYNTHEMUL 97903-00 was poured into a two-gallon pail. The silane solution was then mixed with the film former using moderate agitation. Next, 480 g (8.0%) of MALDENE 286 was added to the mixture of silane and film former. Finally, 200 g (3.3%) of BES homogenate was added under continuous stirring. The organic compound concentration of the resulting chemical treatment solution was 30%. The resulting chemical treatment is suitable for applying to polyamide fibers as well as glass fibers.

EXAMPLE III

Six thousand grams (6000 g) of chemical treatment was formed by the following procedure. Fifteen g (0.25%) of A-1100 was added to 2325 g of deionized water. This was allowed to stir for several minutes. Then 1875 g (31.25%) of COVINAX 201 and 1500 g (25.0%) of COVINAX 225 were combined in a two-gallon pail. The silane solution was then mixed with the mixture of COVINAX film formers using moderate agitation. A terephthalic acid solution was prepared by dissolving 30 g (0.5%) of terephthalic acid in 30 ml of concentrated ammonium hydroxide. The terephthalic acid solution was added to the mixture of silane and film formers. Then, 300 g (5.0%) of Polyemulsion 43N40 was added to the mixture. Finally, 200 g (3.3%) of BES homogenate was added under continuous stirring. The organic compound concentration of the resulting chemical treatment solution was 30%. The resulting chemical treatment is suitable for applying to polypropylene fibers as well as glass fibers.

EXAMPLE IV

Six thousand grams (6000 g) of chemical treatment was formed by the following procedure. Fifteen g (0.25%) of A-1100 (silane) was added to 2020 g of deionized water. This was stirred for several minutes. Next, 3450 g (57.5%) of SYNTHEMUL 97903-00 (film former) was poured into a two-gallon pail. The silane solution was then mixed with the film former using moderate agitation. A terephthalic acid solution was prepared by dissolving 30 g (0.5%) of terephthalic acid in 30 ml of concentrated ammonium hydroxide. The terephthalic acid solution was added to the mixture of silane and film former. Then, 300 g (5.0%) of Polyemulsion 43N40 was added to the mixture. Finally, 200 g (3.3%) of BES homogenate was added under continuous stirring. The organic compound concentration of the resulting chemical treatment solution was 30%. The resulting chemical treatment may be applied to polypropylene fibers as well as glass fibers.

EXAMPLE V

Six thousand grams (6000 g) of chemical treatment was formed by the following procedure. Fifteen g (0.25%) of A-1100 was added to 1870 g of deionized water. This was stirred for several minutes. Next, 3450 g (57.5%) of SYNTHEMUL 97903-00 was poured into a two-gallon pail. The silane solution was then mixed with the film former using moderate agitation. Finally, 200 g (3.3%) of BES homogenate was added under continuous stirring. The organic compound concentration of the resulting chemical treatment solution was 30%. The resulting chemical treatment may be applied to fibers made from a wide variety of materials, including polyphenylene sulfide and inorganic fibers.

EXAMPLE VI

Six thousand grams (6000 g) of chemical treatment was prepared by the following procedure. Fifteen 15 g (0.25%) of A-1100 was added to 2345 g of deionized water. This was allowed to stir for several minutes. Then, 1875 g (31.25%) of COVINAX 201 and 1500 g (25.0%) of COVINAX 225 were combined in a two-gallon pail. The silane solution was then mixed with the mixture of film formers using moderate agitation. Finally, 200 g (3.3%) of BES homogenate was added under continuous stirring. The organic compound concentration of the resulting chemical treatment solution was 30%. The resulting chemical treatment may be applied to fibers made from a wide variety of materials, including polyphenylene sulfide and inorganic fibers.

In reference to the above Examples I–VI, COVINAX 201 and COVINAX 225 are thermoplastic vinyl acrylics which function as film formers and are commercially available from Franklin International, located in Columbus, Ohio. SYNTHEMUL 97903-00 is a thermoplastic urethane film former and is commercially available from Reichold Chemicals Inc., located in Research Triangle Park, N.C. Epoxies, polyvinyl acetates, and polyesters may also be used as film formers. A-1100 is a silane-based coupling agent commercially available from Witco Chemical Company of Chicago, Ill. KESSCO BES is a fatty acid ester which functions as a lubricant and is commercially available from the Stepan Co., of Northfield, Ill. Another lubricant that may be used is a mixture of stearic acid and acetic acid commercially available from Owens Corning under the product name K12. POLYEMULSION 43N40 is a maleic anhydride modified polypropylene wax dispersed in water, which is commercially available from the Chemical Corporation of America, of East Rutherford, N.J. POLYEMULSION 43N40 functions as an interphase modifier to improve the interphase region (adhesion) between glass fibers and a polypropylene matrix material by chemically reacting with the coupling agent. The terephthalic acid is commercially available from the Aldrich Chemical Company of Milwaukee, Wis., and also functions as an interphase modifier to improve adhesion between glass and the polypropylene matrix material by inducing the polypropylene to crystallize close to the glass surface. MALDENE 286 is a partial ammonium salt of butadiene-maleic acid copolymer commercially available from Lindau Chemical Inc., of Columbia, S.C. MALDENE 286 functions as an interphase modifier to improve adhesion between glass fibers and nylon matrix material.

Solvent-Free Chemical Treatments

Solvent-free chemical treatments, such as those described above, may also be used to prepare encased strands. The use of such chemical treatments has advantages, e.g., no substantial amounts of water vapor, volatile organic carbon, or other solvent vapor are generated when processed (e.g., heated) according to the above-described wire-coating method, including during the molding of the composite article. By being substantially solvent-free, the chemical treatment may have its viscosity reduced and/or be heat-cured without experiencing a substantial drop in mass, thereby allowing for most of the chemical treatment that is applied to the fibers to remain on the fibers. Such chemical treatment is preferably also substantially non-photosetting.

Illustrated in FIG. 6 is an embodiment of an apparatus 150 which is capable of making one or more polymer-encased composite strands 126 using solvent-free chemical treatments. The resulting encased composite strands 126, which may be formed into pellets or threads, are also suitable for molding into a fiber-reinforced composite articles. Structural elements and components of the apparatus 150 which are identical or similar to those of the previously described apparatus 110 are indicated by the same reference numerals used above. The exemplary apparatus 150 includes an applicator 116 having a front-facing applicator roller 118 which applies the chemical treatment to the reinforcing fibers 114, thereby forming coated fibers 120. A conventional dual-roller applicator may also be used in place of the single-roller 118.

When it is desired for the applied chemical treatment on the fibers to be heated before the gathering of the fibers 113, an exemplary apparatus 150 has applicator 116 positioned adjacent to the underside of the bushing 115. The applicator 116 is positioned such that the chemical treatment is applied when the fibers 114 are at a high enough temperature (e.g., the fibers 114 emanate enough heat energy) to cause the desired drop in viscosity and/or a desired degree of heat-curing (crosslinking or otherwise increasing the molecular weight) of the applied chemical treatment, depending on the type being applied. At the same time, the applicator 116 is positioned far enough away from the bushing 115 so that the chemical treatment is applied while the fibers 114 are at a temperature which will not cause significant damage to the chemical treatment (e.g., decomposition of any organic chemicals or compounds). In this way, the resulting strand 126 can be provided with the properties desired for subsequent processing into a composite article.

For glass reinforcing fibers 114 drawn from a conventional bushing 115 having a normal throughput, the applicator 116 is preferably disposed so that the chemical treatment is applied to the glass fibers 114 at a minimum of about 3 inches (7.62 cm), preferably, about 6 inches (15.24 cm), from the bushing 115 (from where the fibers exit the bushing). Satisfactory results may be obtained when the chemical treatment is applied to the glass reinforcing fibers 114 in the range from about 8 inches to about 10 inches (20.32 cm to 25.4 cm) from the bushing 115. The optimal location of the applicator 116 relative to the bushing 115 depends, for example, on the type of bushing used (e.g., the number of fibers being drawn from the bushing 115), the temperature of the molten glass material, the type of chemical treatment being applied, the desired properties of the interphase region around at least the reinforcing fibers 14 and the properties desired for the resulting strand 124 and the ultimate composite article.

It may be desirable for the chemical treatment to be kept cool before it is applied to the fibers 14 to allow very reactive ingredients to be used in the chemical treatment and to help reduce the risk of heat-caused degradation of the chemical treatment. It may also be desirable for the temperature of the chemical treatment, before it is applied, to be kept at less than or equal to about room temperature for the same reasons. The chemical treatment can be kept at the desired temperature by suitable means. For example, a cooling coil may be submerged within the chemical treatment. When continuously formed glass fibers are being formed, it may also be desirable for the apparatus to be adapted so as to surround the glass fibers 114 with an inert atmosphere before the chemical treatment is applied. The inert atmosphere should help prevent moisture from accumulating on the surface of the fibers 114, thereby inhibiting moisture-induced cracking and moisture-caused passivation of potential reactive species on the fiber surface, as discussed above. An inert atmosphere is preferably not employed, however, when a high-output bushing is used or any other time the temperature of the glass fibers is sufficiently high.

As with the aqueous-based system depicted in FIG. 4, the fibers 113 being coated with the solvent-free chemical treatment may include fibers other than the continuously drawn reinforcing fibers 114. The fibers 113 may include preformed reinforcing and/or matrix fibers 152. As shown in FIG. 6, the preformed fibers 152 are pulled from spools or other packages and then commingled with the continuously formed reinforcing fibers 114 before all the fibers 113 are gathered into a composite strand 124. The fibers 113 may also include matrix fibers that are continuously produced, for example, from a bushing or spinner, and commingled in-line with the reinforcing fibers 114. Before being commingled, the preformed fibers 152 may be coated with the same or a different chemical treatment than that applied to the reinforcing fibers 114. Depending on the type of fibers 152, a chemical treatment may not be applied to the fibers 152 before the fibers 113 are commingled. The same techniques and equipment may be used to chemically treat each type of reinforcing fiber and matrix fiber, whether they are continuously formed or preformed.

The same applicator 116 can be used to chemically treat both the preformed fibers 152 and the continuously formed fibers 114 before the fibers 113 are gathered into a strand 124. Alternatively, a separate applicator 116' can be used to chemically treat the preformed fibers 152 (as indicated by phantom lines 152'). If a separate applicator 116' is used, the gathering mechanism 127 may include a bar or roller 154 to help commingle the fibers 114 and 152 together before being gathered into the strand 124. The above-incorporated U.S. patent application Ser. No. 08/527,601, now abandoned, describes other methods and apparatus for chemically treating preformed fibers and continuously formed fibers together using the same applicator or separately using different applicators. Alternatively, some of the fibers 113, such as matrix fibers 152, may be gathered with the coated fibers 120 without a chemical treatment first being applied.

A composite article may then be made using conventional techniques, such as by molding one or more encased composite strands 126, in the form of pellets 32, threads 40, or both. The resulting composite article may be formed by using injection molding, compression molding, transfer molding, or any other suitable molding technique. The encased composite threads 140 may be formed into a fabric, for example, by an intermediate weaving or knitting process, and then compression- or transfer-molded into the desired composite article. An example of such a fabric-forming method and apparatus is described in U.S. patent application Ser. No. 08/527,601, filed Sep. 13, 1995, now abandoned, the disclosure of which is hereby incorporated by reference.

Through consideration of the above description and practice of the invention, appropriate modifications of the present invention will be apparent to those skilled in the art. Thus, the scope of the invention is intended not to be limited by the foregoing detailed description or depiction of preferred embodiments, but to be defined by the following claims and equivalents thereof.

What is claimed is:

1. A fiber-containing product for use in the manufacture of fiber-reinforced composite articles comprising:

a) a prepreg strand comprising a plurality of substantially linear and substantially electrically non-conductive gathered reinforcing fibers adhered together with a solidified, substantially solvent-free chemical treatment comprising a thermoplastic film-forming polymer; wherein said chemical treatment is disposed between and forms a substantially continuous coating on the surface of substantially all of the gathered fibers; and b) a thermoplastic coating substantially encasing the prepreg strand.

2. The fiber-containing product of claim 1, in the form of pellets having a length of from about 3/16 to 1½ inches.

3. The fiber-containing product of claim 1, wherein said plurality of substantially linear and substantially electrically non-conductive gathered reinforcing fibers numbers in the range of from about 1,500 to about 10,000 fibers.

4. The fiber-containing product of claim 1, wherein said plurality of substantially linear and substantially electrically non-conductive gathered reinforcing fibers numbers in the range of from about 2,000 to about 4,000 fibers.

5. The fiber-containing product of claim 1, wherein said chemical treatment further comprises a coupling agent.

6. The fiber-containing product of claim 5, wherein said chemical treatment comprises a molten, low molecular weight thermoplastic film-forming polymer and a functionalized organic substrate as the coupling agent.

7. The fiber-containing product of claim 6, wherein the low molecular weight thermoplastic film-forming polymer is derived from a high molecular weight thermoplastic that has been cracked or otherwise processed to a low molecular weight.

8. The fiber-containing product of claim 1, wherein the chemical treatment has a viscosity of up to about 300 cPs at a temperature in the range of from about 93° C. to about 110° C.

9. The fiber-containing product of claim 1, wherein the chemical treatment further comprises one or more compounds selected from the group consisting of processing aids, lubricants, viscosity-modifiers and surfactants.

10. A process of making a fiber-containing product for use in the manufacture of fibre-reinforced composite article comprising:
   a) forming a plurality of substantially linear and substantially electrically non-conductive gathered reinforcing fibers;
   b) applying a coating of a substantially solvent-free chemical treatment comprising a molten thermoplastic film-forming polymer to said fibers to form coated fibers;
   c) gathering said coated fibers to form a prepreg strand; and
   d) encasing the prepreg strand with a thermoplastic material to form a thermoplastic-encased strand.

11. The process of claim 10, wherein the step of encasing the prepreg strand with a thermoplastic material includes using a wire coating process.

12. The process of claim 10, wherein the thermoplastic material used for encasing the prepreg strand is polypropylene.

13. A process of making a fiber-reinforced composite article comprising:
   a) forming a plurality of substantially linear and substantially electrically non-conductive gathered reinforcing fibers;
   b) applying a coating of a substantially solvent-free chemical treatment comprising a molten thermoplastic film-forming polymer to said fibers to form coated fibers;
   c) gathering said coated fibers to form a prepreg strand;
   d) encasing the prepreg strand with a thermoplastic material to form a thermoplastic-encased strand; and
   e) molding the thermoplastic-encased strand to form a fiber-reinforced composite article.

14. The process of claim 13, wherein the substantially solvent-free chemical treatment is applied to the reinforcing fibers immediately after they are formed.

15. The process of claim 13, wherein the step of molding the thermo plastic-encased strand to form a fiber-reinforced composite article comprises using a process of heating or extrusion or both to disperse the fibers of the prepreg strand throughout the thermoplastic material.

16. The process of claim 13, wherein the thermoplastic material used for encasing the prepreg strand is polypropylene.

17. The process of claim 13, further comprising chopping the thermoplastic-encased strand into pellets before molding the thermoplastic-encased strand to form said fiber-reinforced composite article.

18. The process of claim 13, further comprising combining the thermoplastic-encased strand with a resinous matrix material and molding the combination to form said fiber-reinforced composite article.

19. The process of claim 13, wherein the step of encasing the prepreg strand with a thermoplastic material includes using a wire coating process.

20. A fiber-reinforced composite article made by the process of claim 13.

* * * * *